(12) United States Patent
Kawamura et al.

(10) Patent No.: US 7,443,459 B2
(45) Date of Patent: Oct. 28, 2008

(54) LIQUID CRYSTAL DISPLAY DEVICE

(75) Inventors: Taizo Kawamura, Tottori (JP); Toshio Ikeuchi, Tottori-ken (JP)

(73) Assignee: Epson Imaging Devices Corporation, Nagano (JP)

( * ) Notice: Subject to any disclaimer, the term of this patent is extended or adjusted under 35 U.S.C. 154(b) by 322 days.

(21) Appl. No.: 11/475,185

(22) Filed: Jun. 27, 2006

(65) Prior Publication Data

US 2006/0290837 A1    Dec. 28, 2006

(30) Foreign Application Priority Data

Jun. 28, 2005  (JP) ............................ 2005-187720
Jul. 6, 2005   (JP) ............................ 2005-197332

(51) Int. Cl.
*G02F 1/1333* (2006.01)

(52) U.S. Cl. ........................................ 349/58; 349/150

(58) Field of Classification Search ................ 349/56, 349/58, 149, 150
See application file for complete search history.

(56) References Cited

U.S. PATENT DOCUMENTS 5,838,412 A * 11/1998 Ueda et al. .................. 349/150

2006/0133019 A1 * 6/2006 Okuda ........................ 349/58

FOREIGN PATENT DOCUMENTS

JP    2004-283548 A    10/2004

* cited by examiner

*Primary Examiner*—Hemang Sanghavi
(74) *Attorney, Agent, or Firm*—McDermott Will & Emery LLP

(57) ABSTRACT

To provide a liquid crystal display device that can be realized at lower cost, there are provided a liquid crystal panel 2, a liquid crystal shutter 3 and a light guide plate 4 placed behind the liquid crystal panel 2 in the order named, a lamp set 6a facing an end face of the light guide plate 4, a frame body 8 that supports edge portions of the liquid crystal panel 2, the liquid crystal shutter 3, and the light guide plate 4, a fixing plate 7 having a flat portion behind the light guide plate 4 and a side face that supports the lamp set 6a, a supporting plate 40 that is located behind the fixing plate 7 at a first distance away therefrom and that is partially supported by the fixing plate 7, a circuit board 20 placed behind the supporting plate 40, and a flexible circuit board 36 having one end connected to the edge portion of the liquid crystal panel 2 and the other end connected to an edge portion of the circuit board 20.

13 Claims, 17 Drawing Sheets

LIQUID CRYSTAL DISPLAY DEVICE

This application is based on Japanese Patent Applications Nos. 2005-187720 and 2005-197332 filed on Jun. 28, 2005 and Jul. 6, 2005 respectively, the contents of which are hereby incorporated by reference.

BACKGROUND OF THE INVENTION

1. Field of the Invention

The present invention relates to a liquid crystal display device, and more particularly to a liquid crystal display device for use in an entertainment machine.

2. Description of Related Art

An example of a conventional rotary entertainment machine using a liquid crystal display device will be described with reference to FIGS. 16 and 17 (see, for example, JP-A-2004-283548). FIG. 16 is a perspective view showing the exterior appearance of a conventional rotary entertainment machine 100, and FIG. 17 is a longitudinal sectional view showing a positional relationship of a rotary display body 102, a liquid crystal panel 116, and a liquid crystal shutter 112. This rotary entertainment machine 100 has a cabinet 101 provided with, at substantially the top center of the front face thereof, three display windows 103a to 103c arranged side by side through which the surfaces of three rotary display bodies 102a to 102c arranged inside the cabinet 101 can be seen respectively.

A game result display portion of this rotary entertainment machine 100 is provided with first display means composed of three rotary display bodies 102a to 102c, second display means composed of the liquid crystal panel 116 placed in front of the first display means, and third display means composed of the liquid crystal shutter 112 placed between the first display means and the second display means. The second display means has a transmissive display portion (not shown), and transmits what is displayed on the first display means and thus making it visible. The third display means has three display blocking portions 113a to 113c that individually block or transmit what is displayed on the first display means.

The entertainment machine 100 further includes switching control means that switches the display blocking portions 113a to 113c between a state in which what is displayed on the first display means is blocked and a state in which what is displayed on the first display means is transmitted.

Inside the rotary display bodies 102a to 102c, three backlights 117a to 117c are arranged for individually illuminating the rotary display body. In front of the rotary display bodies 102a to 102c, front illumination devices 118a and 118b are placed for illuminating the liquid crystal panel 116 and the liquid crystal shutter 112 from behind and for illuminating the rotary display bodies from the front.

The inventors of the present invention manufactured a liquid crystal display device for use in the entertainment machine 100 by referring to FIG. 17. This liquid crystal display device is provided with an outer frame that covers a liquid crystal panel 116 and a liquid crystal shutter 112. The outer frame has an opening portion at one side thereof and is formed as a picture frame-shaped member. In addition to the liquid crystal panel 116 and the liquid crystal shutter 112, there are placed a light guide plate and a fixing plate. The light guide plate, the fixing plate, and the outer frame each have, at the center thereof, an opening portion.

Inside the picture frame-shaped member of the outer frame, a circuit board is placed on the fixing plate with an insulating tape laid in between. Inside the picture frame-shaped member, there is placed a flexible circuit board having one end connected to an edge portion of the liquid crystal panel 116 and the other end connected to an edge portion of the circuit board.

In general, a general-purpose flexible circuit board is so designed as to have a relatively long length so as to be connected to a circuit board fixed to a bottom plate provided behind the liquid crystal panel 116. As a result, in the liquid crystal display device manufactured by the inventors of the present invention, an assembly of this flexible circuit board and the circuit board connected thereto increases in length. This makes larger the width of the picture frame-shaped member accommodating this assembly, undesirably increasing the external dimension (width) of the outer frame.

On the other hand, if the opening portion of the outer frame is made smaller so as not to increase the external dimension of the outer frame, this makes it harder for the user to visually see, through the opening portion, the rotary display bodies 102a to 102c located behind the opening portion.

To overcome the problem described above, the inventors of the present invention studied the use of a shorter flexible circuit board, only to find out that, since it is not a general-purpose flexible circuit board, this inconveniently leads to increased cost.

Incidentally, a clearance of a predetermined distance was created between the liquid crystal panel 116 and the liquid crystal shutter 112. However, the liquid crystal shutter 112 is bent toward the liquid crystal panel 116 and then is brought into contact therewith, undesirably creating moire (interference of light). Through a study in search of the causes, the inventors of the present invention have found out that, since first and second circuit boards constituting the liquid crystal shutter 112 are thin, the liquid crystal shutter 112 is warped (bent) to one side.

To overcome the problem described above, the inventors of the present invention manufactured a liquid crystal shutter by using first and second circuit boards each having the same thickness as that of the circuit board used in the liquid crystal panel 116. This inconveniently leads to increased cost.

SUMMARY OF THE INVENTION

In view of the conventionally experienced problems described above, it is an object of the present invention to provide a liquid crystal display device that can be realized at lower cost.

To achieve the above object, according to one aspect of the present invention, a liquid crystal display panel is provided with: a liquid crystal panel; a liquid crystal shutter and a light guide plate placed behind the liquid crystal panel in the order named; a lamp set facing an end face of the light guide plate; a frame body that supports edge portions of the liquid crystal panel, the liquid crystal shutter, and the light guide plate; a fixing plate having a flat portion behind the light guide plate and a side face that supports the lamp set; a supporting plate that is located behind the fixing plate at a first distance away therefrom and that is partially supported by the fixing plate; a circuit board placed behind the supporting plate; a flexible board having one end connected to the edge portion of the liquid crystal panel and the other end connected to an edge portion of the circuit board; and an outer frame that covers the liquid crystal panel, the liquid crystal shutter, the light guide plate, the lamp set, the frame body, the fixing plate, the supporting plate, the circuit board, and the flexible board, the outer frame being formed as a picture frame-shaped member. The light guide plate, the fixing plate, the outer frame each have an opening portion at substantially the center thereof. The supporting plate, the circuit board, and the flexible board are placed inside the picture frame-shaped member adjacent to the opening portion of the outer frame. Specifically, inside the picture frame-shaped member of the outer frame, the supporting plate is arranged behind the fixing plate at a first distance away therefrom and the circuit board is arranged behind the supporting plate. As a result, since the circuit board is located further away from the fixing plate toward a back face side than in conventional liquid crystal display devices, the use of conventional flexible circuits board does not make larger the width of the picture frame-shaped member of the outer frame than that of conventional picture frame-shaped members. Moreover, this prevents the opening portion of the outer frame from becoming smaller. Furthermore, this eliminates the need to use a newly developed flexible board, and thus reduces costs.

Preferably, the flexible board includes a tape carrier package (hereinafter may be referred to as a TCP). This reduces the trouble of wiring for IC, because a driver IC is built therein.

Preferably, the TCP includes a first part extending from the one end to a boundary through the vicinity of a bottom of the frame body and the vicinity of a side of the frame body, and a second part extending from the boundary to the vicinity of an end face of the circuit board, the second part being inclined relative to the circuit board. Since the second part has virtually zero radius of curvature, it is possible to prevent the IC mounted on the TCP from suffering from great stress.

Preferably, the supporting plate has a flat portion and a pair of first fixing members formed therein, the flat portion being placed in parallel with the fixing plate and the pair of first fixing members each being connected to an edge of the flat portion and extending to a front face of the liquid crystal panel and then bending perpendicularly, and the first distance is maintained by fixing the first fixing member to the fixing plate. With this structure, the first distance (that is, the fixing plate and the supporting plate) is properly maintained.

Preferably, the supporting plate has a pair of second fixing members formed therein, the pair of second fixing members each being connected to an edge of the flat portion and extending toward the circuit board and then bending perpendicularly, and the circuit board is fixed on the second fixing members. With this structure, a second distance is properly maintained between the flat portion and the circuit board, making it possible to prevent wiring on the rear surface of the circuit board from making contact with an electric conductor and then being short-circuited.

Preferably, the supporting plate has an opening in the flat portion and a third fixing member formed in the vicinity of the opening, the third fixing member extending to the front face of the liquid crystal panel and then bending perpendicularly, the fixing plate has a protrusion protruding toward a back face thereof, and the third fixing member is fixed to the protrusion. Advisably, the supporting plate is securely fixed to the fixing plate without using additional new members. The fixing plate used here has a protrusion protruding toward a back face thereof, and a third fixing member of the supporting plate is placed on the projecting portion and is then fixed thereto with a screw. This makes it possible to prevent the tip of the screw from making contact with the reflecting sheet and the light guide plate placed on the front face of the fixing plate.

Preferably, the first fixing members and the second fixing members are arranged in such a way that a first virtual line connecting the first fixing member formed at one edge of the flat portion and the first fixing member formed at the other edge of the flat portion and a second virtual line connecting the second fixing member formed at one edge of the flat portion and the second fixing member formed at the other edge of the flat portion intersect. Preferably, the pair of first fixing members each being formed at one edge of the supporting plate are diagonally arranged with respect to the fixing plate, because this makes it possible to prevent the supporting plate from wobbling. Similarly, it is preferable that the pair of second fixing members each being formed at one edge of the supporting plate be diagonally arranged with respect to the circuit board, because this makes it possible to prevent the circuit board from wobbling.

To achieve the above object, according to another aspect of the present invention, a liquid crystal display device is provided with: a liquid crystal panel; a liquid crystal shutter and a light guide plate placed behind the liquid crystal panel in the order named; a lamp set placed so as to face an end face of the light guide plate; a frame body that supports edge portions of the liquid crystal panel, the liquid crystal shutter, and the light guide plate; and an outer frame that covers the liquid crystal panel, the liquid crystal shutter, the light guide plate, the lamp set, and the frame body, the outer frame being formed as a picture frame-shaped member. The light guide plate and the outer frame each have an opening portion at substantially the center thereof, and the liquid crystal shutter is placed in the opening portion of the light guide plate in such a way as to be bent toward a back face side. With this structure, the liquid crystal shutter is placed in such a way as to be bent toward a back face side. This prevents the liquid crystal panel and the liquid crystal shutter each being placed on the front face of the liquid crystal shutter from making contact with each other, and thus helps prevent moire. Moreover, since it is possible to use conventional liquid crystal shutters, cost reduction can be achieved.

Preferably, the liquid crystal shutter has a substantially rectangular shape as seen from the front, and a pair of spacers are located between the vicinities of a pair of shorter sides of the rectangular shape and the edge portions of the liquid crystal panel. With this structure, by providing the spacers between the vicinities of the shorter sides and the edge portions of the liquid crystal panel, it is possible to maintain a predetermined distance between the liquid crystal shutter and the liquid crystal panel at least in the vicinities of the shorter sides of the liquid crystal shutter.

Preferably, a diffusing sheet having an opening portion at substantially the center thereof is placed between a back face of the liquid crystal shutter and a front face of the light guide plate. Since the spacers, the liquid crystal shutter, and the diffusing sheet are laid in between the edge portions of the liquid crystal panel and the light guide plate, the edge portions of the liquid crystal shutter are fixed and maintained in a proper position.

Preferably, the liquid crystal shutter has a substantially rectangular shape as seen from the front, and the vicinities of a pair of longer sides of the rectangular shape are located between a pair of long shoulders formed in the frame body and a front face of the light guide plate. Since the vicinities of the longer sides of the liquid crystal shutter are located between the shoulders and the front face of the light guide plate, a predetermined distance is maintained between the liquid crystal shutter and the liquid crystal panel at least in the vicinities of the longer sides of the liquid crystal shutter.

Preferably, the liquid crystal shutter includes at least a first circuit board, a second circuit board placed at a predetermined distance away from the first circuit board, a liquid crystal laid in between the first circuit board and the second circuit board, and a sealing member that fills a first gap between an end face of the second circuit board and the first circuit board and a second gap between an end face of the first circuit board and the second circuit board. Since the first gap and the second gap are sealed with the sealing member, it is possible to prevent moisture, for example, from entering the liquid crystal shutter.

Preferably, the sealing member includes a thermosetting adhesive or a photo-setting adhesive. Sealing with the thermosetting adhesive or the photo-setting adhesive used as the sealing member makes it easy to perform assembly work, and ensures reliable sealing.

DETAILED DESCRIPTION OF PREFERRED EMBODIMENTS

Hereinafter, embodiments of the present invention will be described specifically with reference to the accompanying drawings. It should be understood, however, that the embodiments presented below are simply intended to give an example of a liquid crystal display device that embodies the technical idea of the present invention, and therefore the liquid crystal display device specifically described below is not intended to limit in any way the manner in which to carry out the present invention. That is, the present invention finds wide application in the technical fields to which the appended claims are directed.

Figure 1:
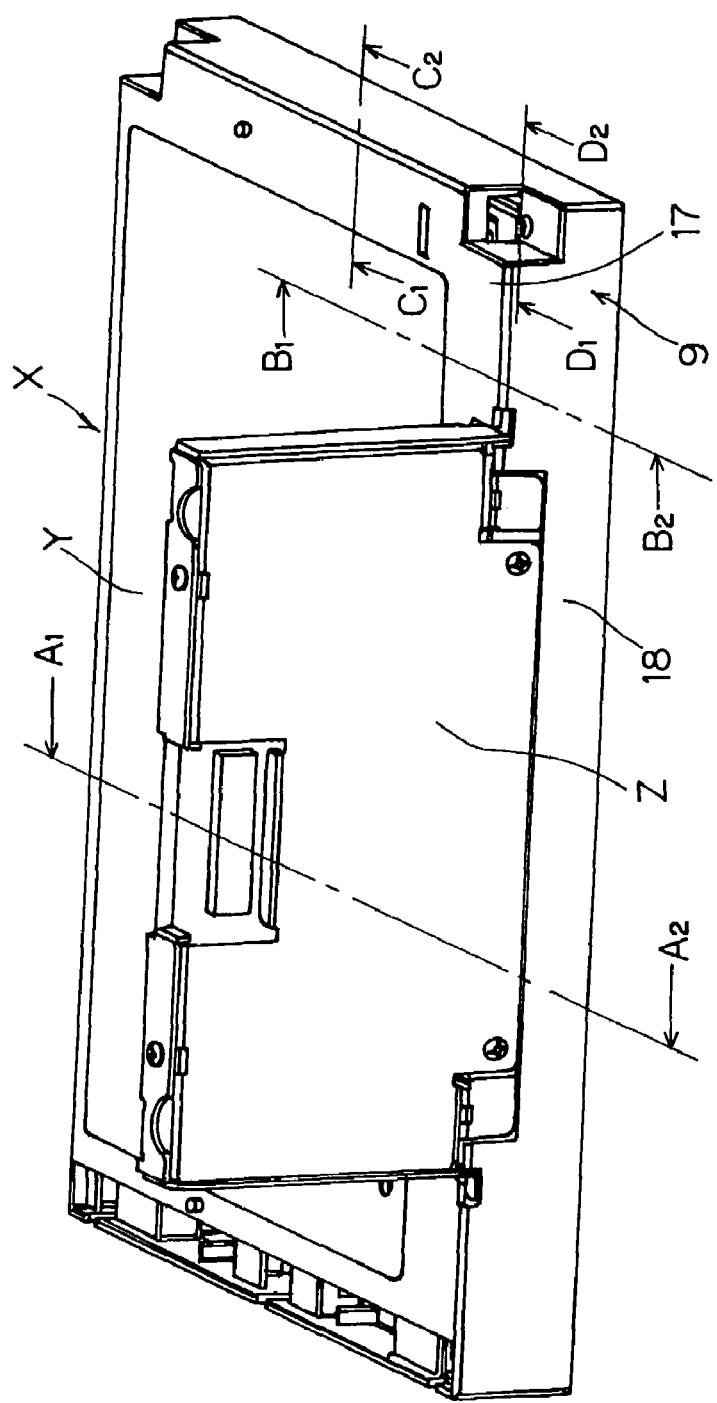
FIG. 1 is a perspective view showing the structure of the liquid crystal display member Y and the circuit board supporting member Z, as seen from the back, of first and second embodiments of the present invention.
Figure 2:
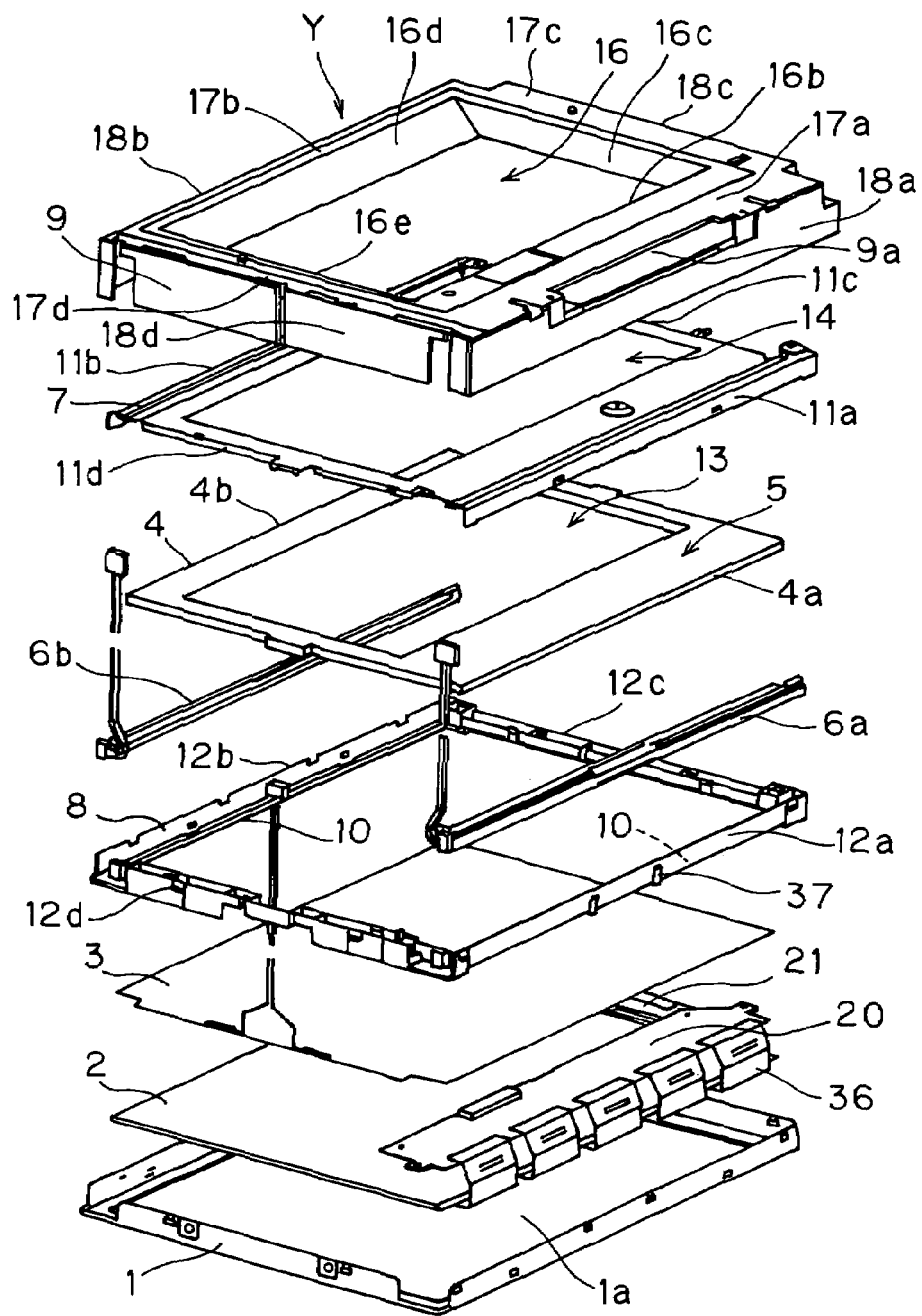
FIG. 2 is an exploded perspective view showing the principal components of the liquid crystal display member Y of FIG. 1 in the first and second embodiments of the present invention.
Figure 3:
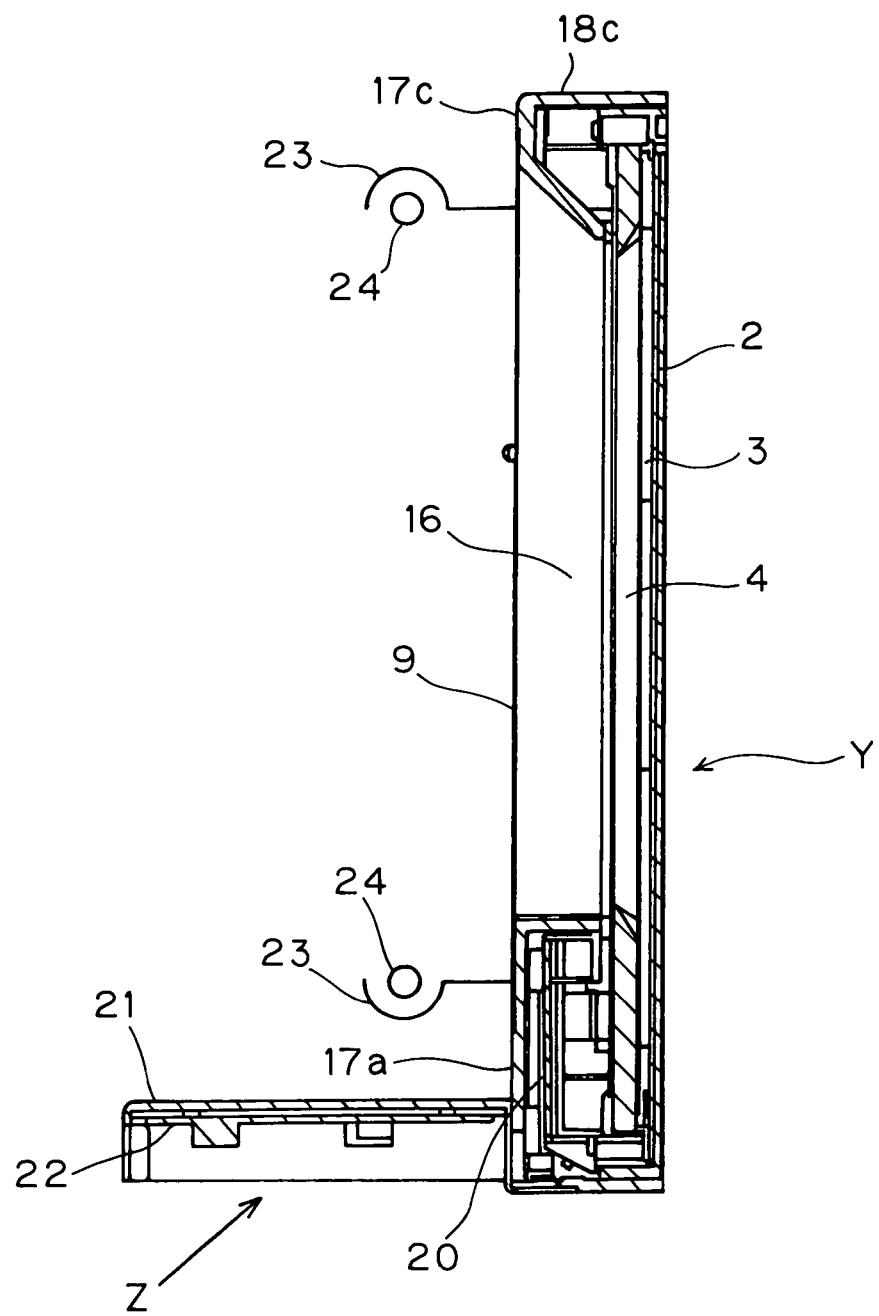
FIG. 3 is a sectional side view taken on the line A1-A2 of FIG. 1 in the first and second embodiments of the present invention.
Figure 4:
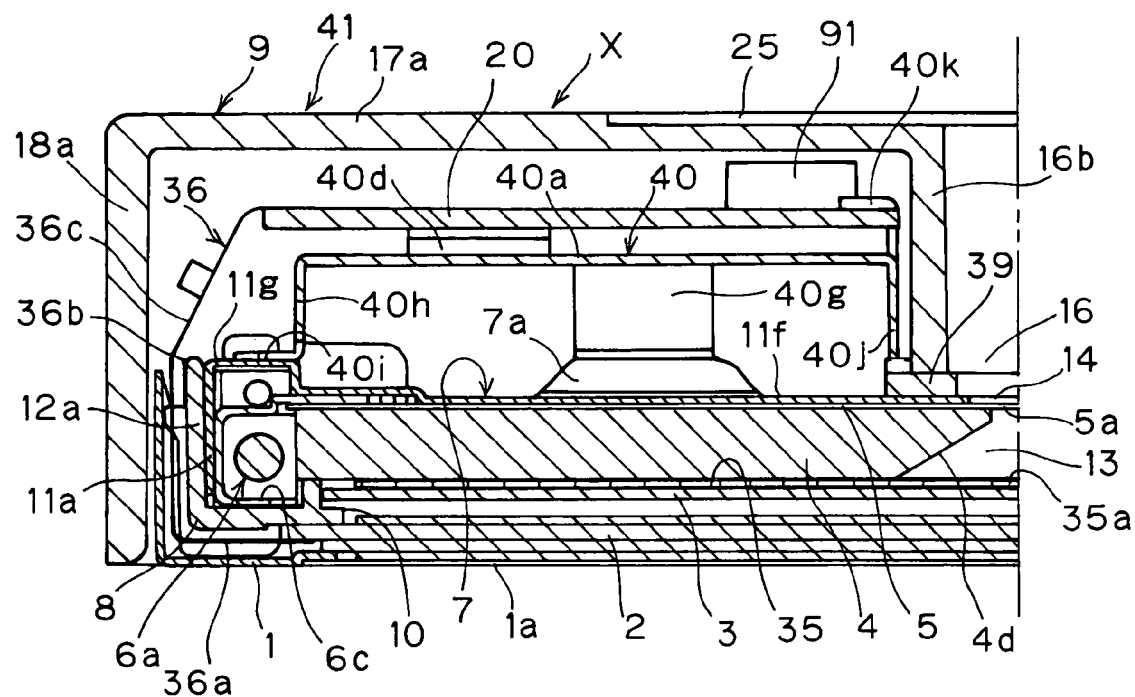
FIG. 4 is a sectional side view taken on the line B1-B2 of FIG. 1 in the first and second embodiments of the present invention.
Figure 5:
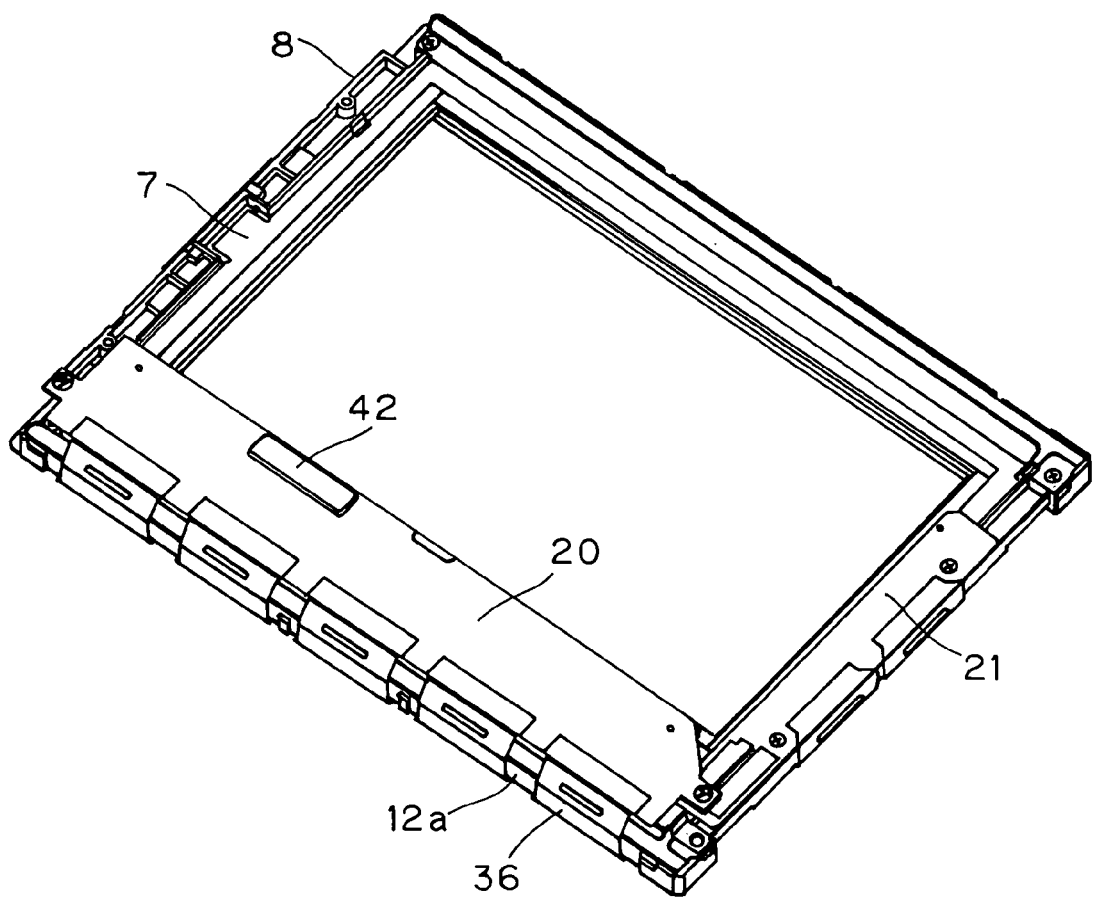
FIG. 5 is a schematic view of a principal portion of the first embodiment of the present invention.
Figure 6:
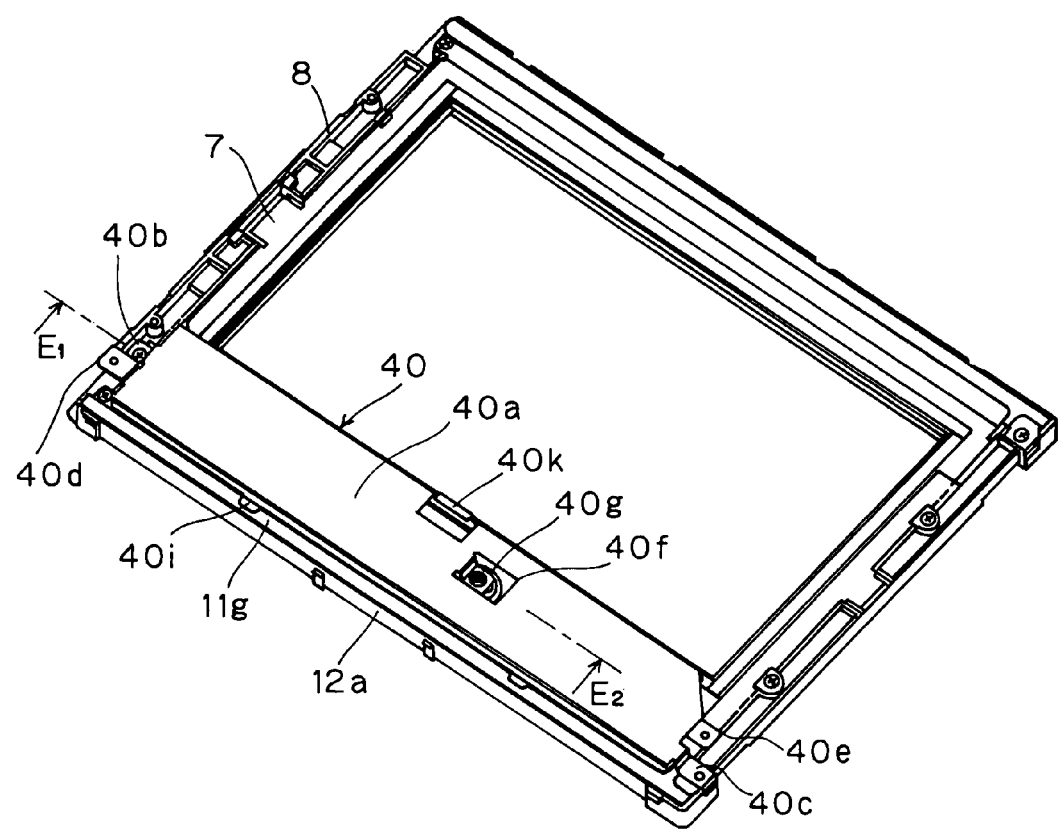
FIG. 6 is a perspective view of FIG. 5, in its state with the circuit board 20 detached therefrom.
Figure 7:
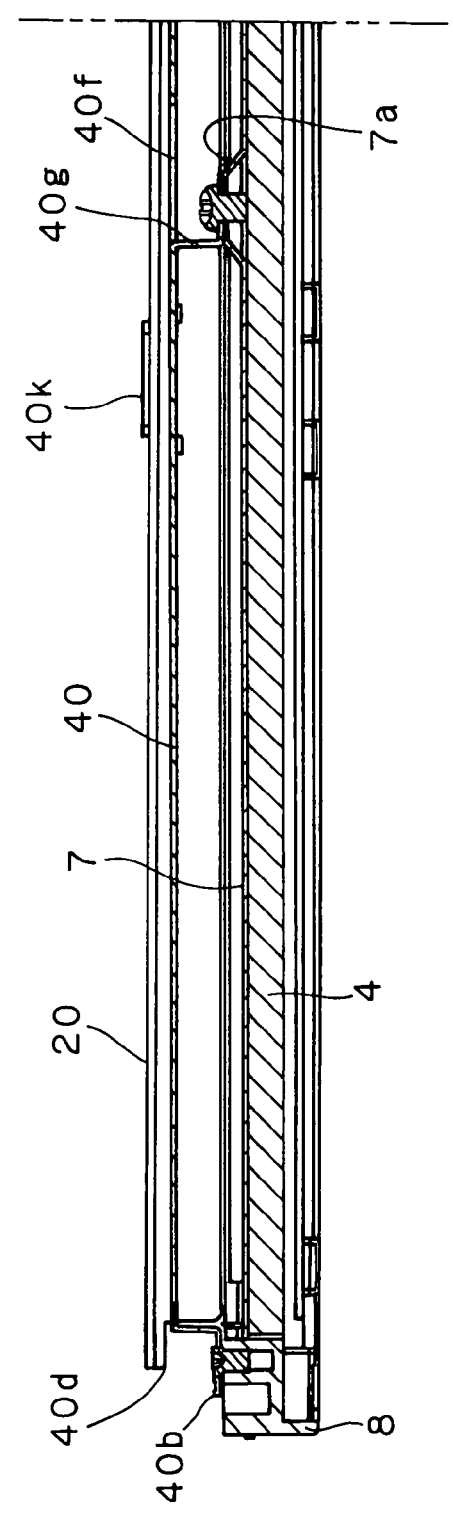
FIG. 7 is a sectional side view taken on the line E1-E2 of FIG. 6.
Figure 8:
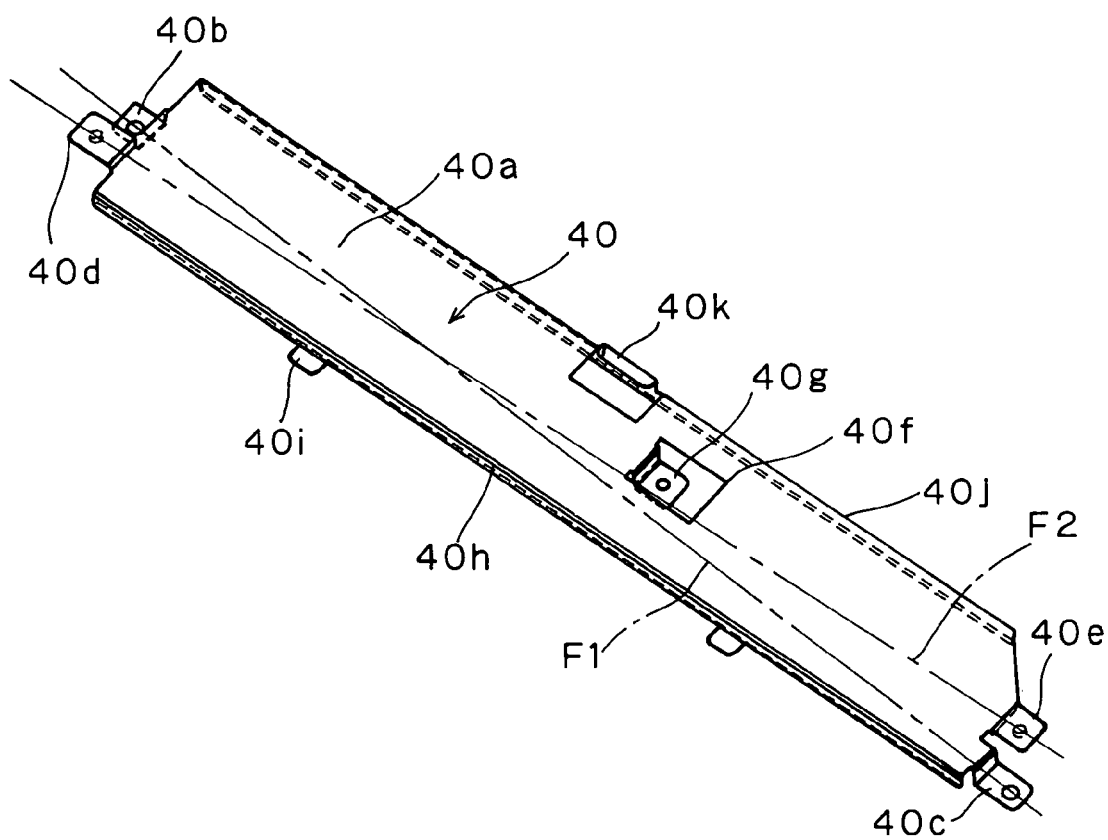
FIG. 8 is a perspective view of the supporting plate 40 used in the liquid crystal display device X of the first and second embodiments of the present invention.
Figure 9:
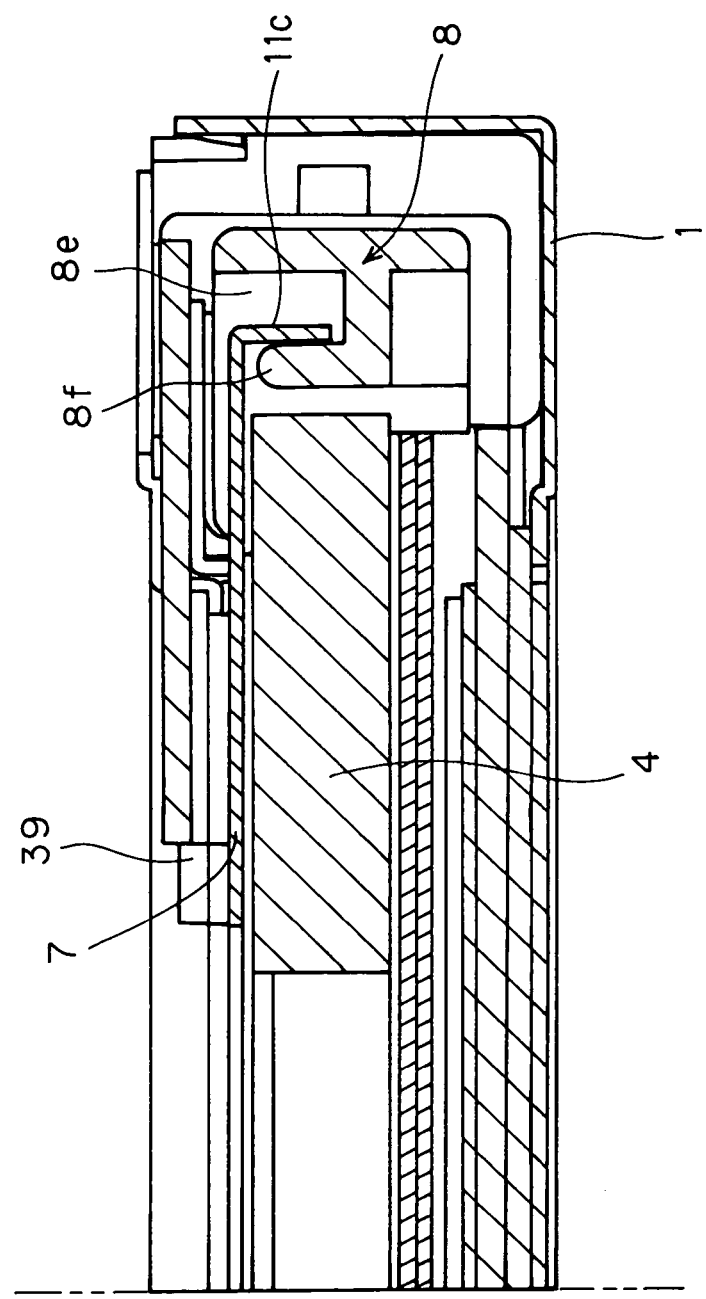
FIG. 9 is a sectional side view taken on the line C1-C2 of FIG. 1 of the first embodiment of the present invention.
Figure 10:
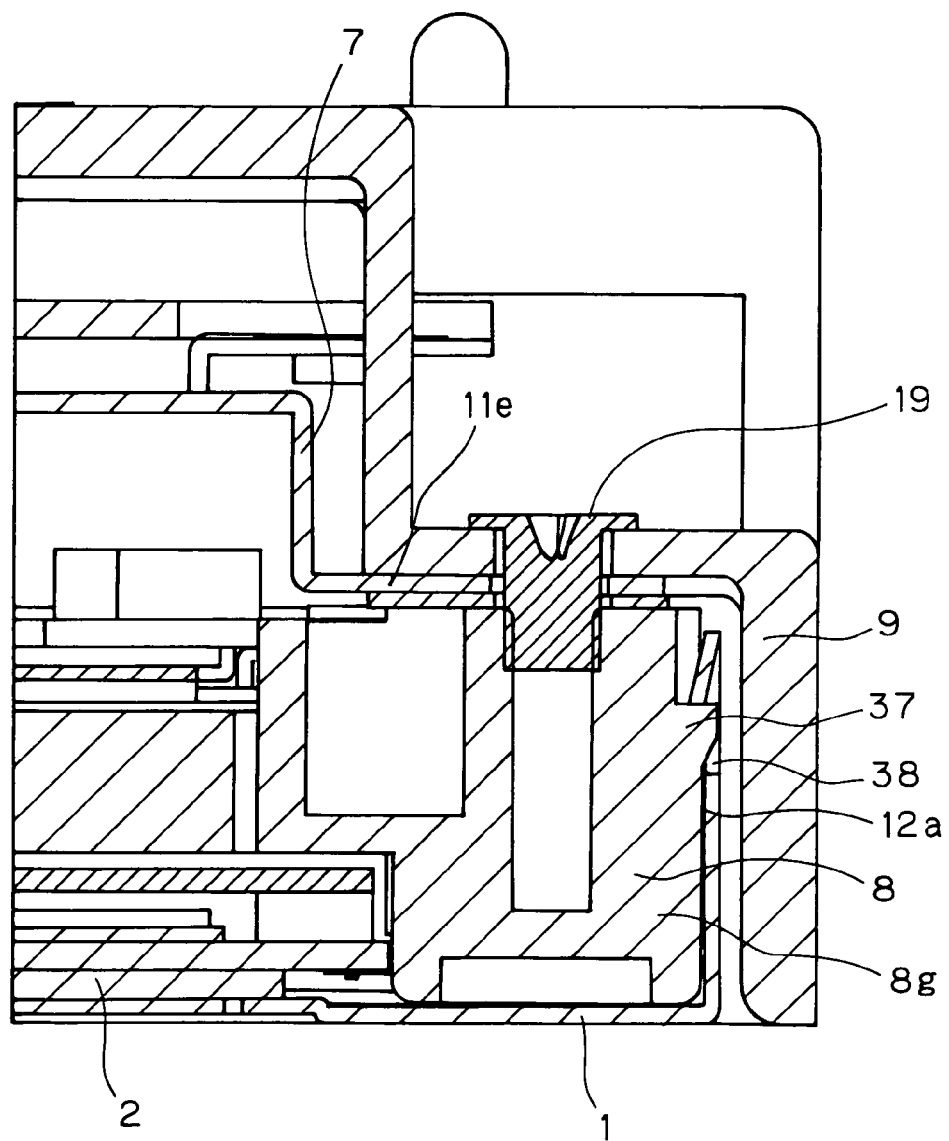
FIG. 10 is a sectional view taken on the line D1-D2 of FIG. 1 of the first and second embodiments of the present invention.
Figure 11:
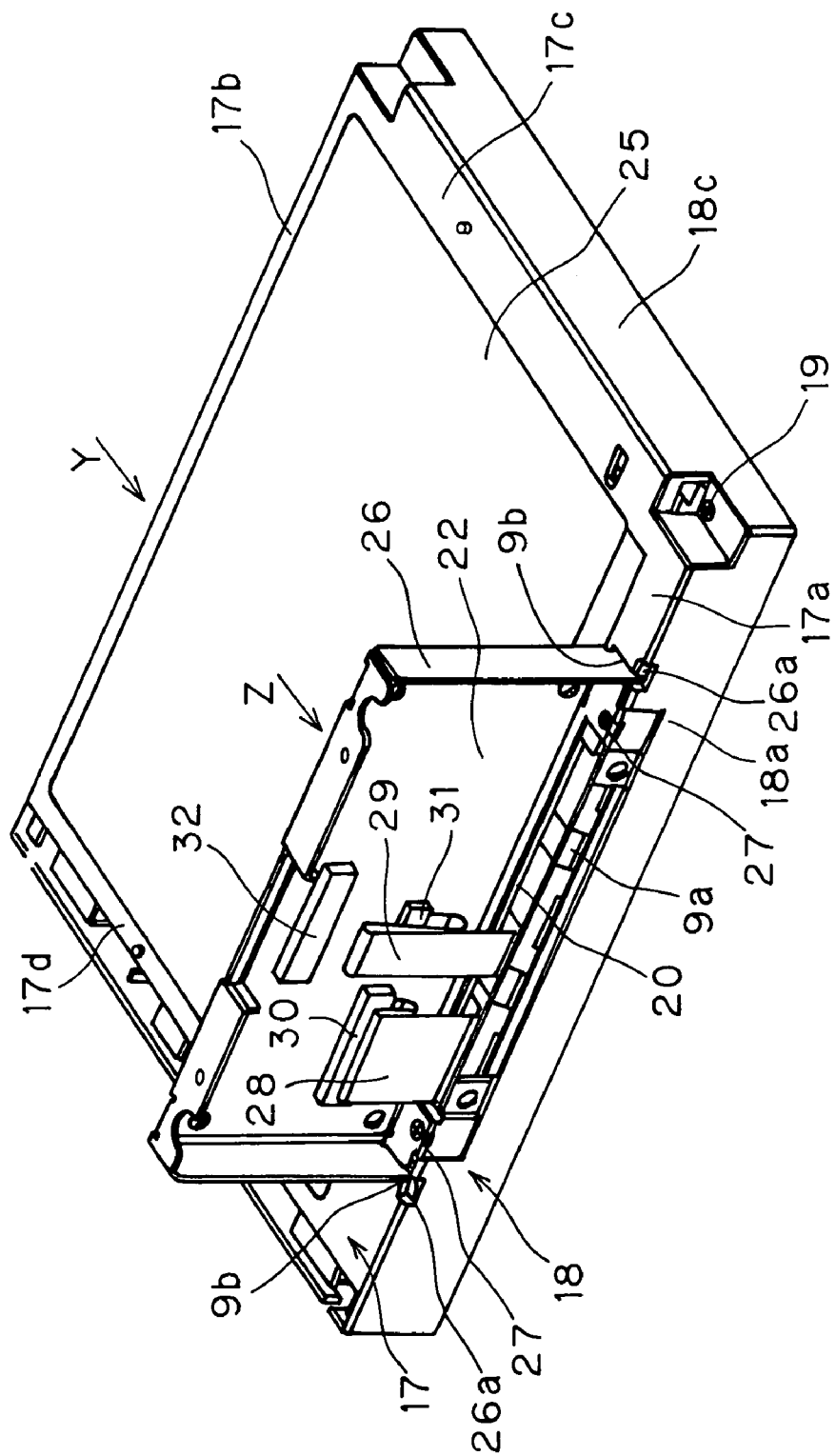
FIG. 11 is a perspective view of the circuit board supporting member Z of FIG. 1, in its state with a cover thereof detached therefrom, of the first and second embodiments of the present invention.

First, a first embodiment of the present invention will be described. FIGS. 1 to 11 show a liquid crystal display device X of the first embodiment of the present invention. FIG. 1 is a perspective view showing the structure of a liquid crystal display member Y and a circuit board supporting member Z, as seen from the back, of the first embodiment of the present invention. FIG. 2 is an exploded perspective view showing the principal components of the liquid crystal display member Y of FIG. 1. FIG. 3 is a sectional view taken on the line A1-A2 of FIG. 1. FIG. 4 is a sectional view taken on the line B1-B2 of FIG. 1. FIG. 5 is a schematic view of a principal portion of the liquid crystal display device X. FIG. 6 is a perspective view of FIG. 5, in its state with the circuit board detached therefrom. FIG. 7 is a sectional view taken on the line E1-E2 of FIG. 6. FIG. 8 is a perspective view of a supporting plate used in the liquid crystal display device X. FIG. 9 is a sectional view taken on the line C1-C2 of FIG. 1. FIG. 10 is a sectional view taken on the line D1-D2 of FIG. 1. FIG. 11 is a perspective view of the circuit board supporting member Z of FIG. 1, in its state with a cover thereof detached therefrom.

As shown in the back perspective view of FIG. 1, the liquid crystal display device X of the present embodiment is composed of the liquid crystal display member Y and the circuit board supporting member Z. Inside a back portion 17 and an exterior portion 18 of an outer frame 9 of the liquid crystal display member Y, there are provided a circuit board 20 and another circuit board 21, each being connected to a liquid crystal panel 2. The liquid crystal display member Y is fitted with the circuit board supporting member Z vertically placed in the back portion 17a of the outer frame 9. Inside the circuit board supporting member Z, there is provided another circuit board 22 electrically connected to the circuit boards 20 and 21.

First, the principal components of the liquid crystal display member Y will be described by referring to FIG. 2, which is an exploded perspective view of the liquid crystal display member Y of FIG. 1. The liquid crystal display member Y is fitted with the liquid crystal panel 2 behind a front face frame 1 having an opening portion 1a, and is provided with a liquid crystal shutter 3, a diffusing sheet 35 (not shown in FIG. 2), a light guide plate 4, and a reflecting sheet 5 behind the liquid crystal panel 2 in the order named. A lamp set 6a used as a light source is so arranged as to face an end face 4a of the light guide plate 4, and a lamp set 6b used as a light source is so arranged as to face an end face 4b of the light guide plate 4.

The light guide plate 4 and the reflecting sheet 5 have, at substantially the center thereof, opening portions 13 and 5a, respectively, so as to make an object (for example, a pattern or symbol, which is not shown in the drawing) displayed by a rotary display body, for example, placed above the reflecting sheet 5 visible from the front face of the liquid crystal panel 2.

The light guide plate 4 is placed inside a picture frame-shaped frame body 8 with the lamp set 6a and the lamp set 6b closely facing the end faces 4a and 4b, respectively, of the light guide plate 4. The frame body 8 supports edge portions of the liquid crystal panel 2, the liquid crystal shutter 3, the light guide plate 4, and the reflecting sheet 5 (see FIG. 4).

The fixing plate 7 has, at the center thereof, an opening portion 14 like those of the light guide plate 4 and the reflecting sheet 5. A flat portion 11f of the fixing plate 7 is placed behind the light guide plate 4 (more specifically, behind the reflecting sheet 5), and side faces 11a and 11b thereof support the lamp sets 6a and 6b, respectively.

There is provided a flexible circuit board 36 having one end connected to the edge portion of the liquid crystal panel 2 and the other end connected to the circuit board 20. This flexible circuit board 36 is built with a tape carrier package (TCP), for example. Incidentally, the tape carrier package (TCP) is manufactured by TAB (tape automated bonding), for example.

Unlike the above description, a wiring pattern may be formed at the edge portion of the liquid crystal panel 2, and the input terminals of the driver IC may be connected to one side of the wiring pattern (referred to as COG). In that case, one end of the flexible circuit board 36 may be connected to the other side of the wiring pattern. In the following description, explanations will be given under the assumption that the flexible circuit board 36 is built with a tape carrier package (TCP).

As in the case of the flexible circuit board 36, there is provided a flexible circuit board (not shown) having one end connected to the edge portion of the liquid crystal panel 2 and the other end connected to the circuit board 21.

The front face frame 1 opens at a front face thereof, has the opening portion 1a at substantially the center thereof, and is formed in the shape of a box. The edge portions of the liquid crystal panel 2 and the bottom face of the frame body 8 are placed on the bottom of the front face frame 1 (see FIG. 4). As shown in FIG. 10, the frame body 8 has, in a side face 12a thereof, a projecting portion 37 projecting outward.

The front face frame 1 has a hole 38 in the side face thereof. The front face frame 1 is fixed to the frame body 8 by fitting the projecting portion 37 in this hole 38 (see FIGS. 2, 4, and 10).

As shown in FIG. 4, the outer frame 9 covers the above-described components 2, 3, 35, 4, 5, 6a, 6b, and 7, is arranged behind the fixing plate 7, and is formed as a picture frame-shaped member. How the outer frame 9 is actually fixed will be described in detail later.

The outer frame 9 has an opening portion 16 at the center thereof, and is provided with exterior portions 18a to 18d extending from the back portions 17a to 17d, respectively, as vertical walls thereof. The circuit board supporting member Z is provided on the back portion 17a in such a way that it is fixed vertically to the back face of the outer frame 9.

The front face frame 1, the diffusing sheet 35, the light guide plate 4, the reflecting sheet 5, the fixing plate 7, and the outer frame 9 have opening portions 1a, 35a, 13, 5a, 14, and 16, respectively, at substantially the center thereof.

On the periphery of the opening portion 16 of the outer frame 9, there is formed an interior portion 16b extending to the back face side. Specifically, the interior portion 16b of the outer frame 9 is so formed as to be connected to the back portion 17a (see FIG. 4).

The fixing plate 7 is provided with a gasket 39 around the periphery of the opening portion 14. A bottom face of the interior portion 16b comes into contact with a back face of the gasket 39. The gasket 39 is formed of, for example, urethane foam, natural rubber, or silicone rubber, and has elasticity.

As shown in FIG. 4, a transparent panel 25 is bonded to the back portion 17a abutting on the opening portion 16 formed in the outer frame 9 with a sealing member (not shown) laid in between.

Referring to FIG. 4, a first feature of the liquid crystal display device X of the present embodiment is summed up as follows. There are provided the liquid crystal panel 2, and, behind the liquid crystal panel 2 in the order named, the liquid crystal shutter 3 and the light guide plate 4, and there are provided the lamp set 6a facing the end face of the light guide plate 4 and the frame body 8 supporting the edge portions of the liquid crystal panel 2, the liquid crystal shutter 3, and the light guide plate 4.

There is provided the fixing plate 7 having the flat portion 11f behind the light guide plate 4 and the side face 11a supporting the lamp set 6a. There is provided the supporting plate 40 that is located behind the fixing plate 7 at a first distance away therefrom and is partially supported by the fixing plate 7.

There is provided the circuit board 20 placed behind the supporting plate 40, and there is provided the flexible circuit board 36 having one end connected to the edge portion of the liquid crystal panel 2 and the other end connected to the edge portion of the circuit board 20.

There is provided the outer frame 9 that is formed as a picture frame-shaped member 41 and covers the above-described components. The light guide plate 4, the fixing plate 7, and the outer frame 9 have the opening portions 13, 14, and 16, respectively, at substantially the center thereof. Inside the picture frame-shaped member 41 of the outer frame 9 abutting on the opening portion 16 of the outer frame 9, there are arranged the supporting plate 40, the circuit board 20, and the flexible circuit board 36, for example.

Next, referring to FIG. 4, a second feature of the liquid crystal display device X of the present embodiment is summed up as follows. The flexible circuit board 36 is built with a tape carrier package (TCP).

Furthermore, referring to FIG. 4, a third feature of the liquid crystal display device X of the present embodiment is summed up as follows. A first part 36a of the TCP 36 is a part extending from one end thereof connected to the edge portion of the liquid crystal panel 2 to a boundary 36b through the vicinity of the bottom of the frame body 8 and the vicinity of the side of the frame body 8.

A second part 36c is a part extending from the boundary 36b to the vicinity of the end face of the circuit board 20, and is inclined relative to the circuit board 20.

Next, referring to FIGS. 4, 6, 7, and 8, a fourth feature of the liquid crystal display device X of the present embodiment is summed up as follows. The supporting plate 40 has a flat portion 40a placed horizontally with respect to the fixing plate 7. There are formed a pair of first fixing members 40b and 40c, each being connected to the edge of the flat portion 40a and extending to the front face of the liquid crystal panel 2 and then bending perpendicularly. By fixing the first fixing members 40b and 40c to the fixing plate 7, the first distance is maintained.

Furthermore, referring to FIGS. 4 to 8, a fifth feature of the liquid crystal display device X of the present embodiment is summed up as follows. The supporting plate 40 has a pair of second fixing members 40d and 40e, each being connected to the edge of the flat portion 40a and extending toward the circuit board 20 and then bending perpendicularly. By fixing the circuit board 20 on the second fixing members 40d and 40e, a second distance is maintained between the flat portion 40a and the circuit board 20.

Next, referring to FIGS. 4 to 8, a sixth feature of the liquid crystal display device X of the present embodiment is summed up as follows. The supporting plate 40 has an opening 40f in the flat portion 40a. In the vicinity of the opening 40f, there is formed a third fixing member 40g extending to the front face of the liquid crystal panel 2 and then bending perpendicularly. The fixing plate 7 has a protrusion 7a protruding toward the back face thereof. The third fixing member 40g is fixed to the protrusion 7a.

Furthermore, referring to FIGS. 4 to 8, a seventh feature of the liquid crystal display device X of the present embodiment is summed up as follows. The first fixing members 40b and 40c and the second fixing members 40d and 40e are arranged in such a way that a first virtual line F1 connecting the first fixing member 40b formed at one edge of the flat portion 40a and the first fixing member 40c formed at the other edge of the flat portion 40a and a second virtual line F2 connecting the second fixing member 40d formed at one edge of the flat portion 40a and the second fixing member 40e formed at the other edge of the flat portion 40a intersect (see FIG. 8).

Incidentally, in one of the longer sides of the flat portion 40a of the supporting plate 40 shown in FIG. 8, a bent portion 40h is formed so as to be bent toward the front face of the liquid crystal panel 2. The bent portion 40h has two projecting portions 40i, each being bent perpendicularly with respect to the bent portion 40h. The projecting portions 40i are each formed so as to make contact with a jutting portion 11g formed in the fixing plate 7 (see FIGS. 4 and 6).

As shown in FIG. 8, in the other of the longer sides of the flat portion 40a of the supporting plate 40, a bent portion 40j is formed so as to be bent toward the front face of the liquid crystal panel 2. There is suitably formed a hook portion 40k in the flat portion 40a of the supporting plate 40, the hook portion 40k extending toward the circuit board 20 and then extending perpendicularly inward.

As shown in FIG. 5, the circuit board 20 is placed on the second fixing members 40e and 40d formed in the supporting plate 40, and is then fixed thereto with a screw. At this time, the hook portion 40k supports the back face of the circuit board 20, thereby preventing the circuit board 20 from wobbling.

The circuit board 22 shown in FIG. 11 has a connector 30 to which one end of a flexible printed circuit board 28 is connected. The other end of the flexible printed circuit board 28 is connected to a connector 42 shown in FIG. 5. This is the end of the description of the features of the liquid crystal display device X.

In FIG. 3, which is a sectional side view taken on the line A1-A2 of FIG. 1, the liquid crystal display member Y of the liquid crystal display device X is provided with the liquid crystal shutter 3 between the liquid crystal panel 2 and an object (for example, a pattern or symbol) displayed by the rotary display body, for example, which is not shown in the drawing, placed above the liquid crystal display member Y. This liquid crystal shutter 3 can perform high-speed switching, and becomes transparent when it is opened (when an applied voltage is in an on state).

When the liquid crystal shutter 3 becomes transparent, since an object projection light source 24 attached to a reflector 23 is lit above the liquid crystal display member Y, the object (for example, a pattern or symbol) displayed by the rotary display body, for example, placed behind the liquid crystal display member Y becomes visible through the opening portion 16 of the outer frame 9. At this time, what is displayed in the edge portion of the liquid crystal panel 2 other than the part corresponding to the opening portion 16 becomes visible to the player from the front face of the liquid crystal display member Y.

When the liquid crystal shutter 3 is closed (when an applied voltage is in an off state), it becomes opaque white and makes the object (for example, a pattern or symbol) invisible. In this way, it serves as the light guide plate 4. At this time, since the object projection light source 24 is lit, the light guide plate 4 and the liquid crystal shutter 3 are illuminated. As a result, the player can view what is supposed to be displayed at the center and in the edge portion of the liquid crystal panel 2.

As shown in FIG. 4, by placing the liquid crystal shutter 3 on shoulders 10 formed in the frame body 8, a predetermined gap G, for example, a gap of 0.4 mm is left between the liquid crystal panel 2 and the liquid crystal shutter 3. This eliminates the possibility of interference of light between the liquid crystal panel 2 and the liquid crystal shutter 3, making it possible to prevent the generation of moire in the liquid crystal panel 2.

As shown in FIG. 2, the fixing plate 7 has the opening portion 14 at the center thereof and four side faces 11a to 11d. The lamp set 6a is fixed between one of these four side faces, namely, the side face 11a and the light guide plate 4, and the lamp set 6b is fixed between the side face 11b facing the side face 11a and the light guide plate 4.

As shown in FIG. 4, a reflecting plate 6c of the lamp set 6a and a reflecting plate 6d of the lamp set 6b are each stuck in between the frame body 8, the fixing plate 7, and the light guide plate 4. This brings each lamp set into intimate contact with the light guide plate 4, preventing light from leaking out. This makes it possible to reduce eye strain of the player.

The light guide plate 4 has inclined faces 4c and 4d that abut on the opening portion 13 and are increasingly separated from each other toward the liquid crystal panel 2. As a result, the light guide plate 4 has no vertical inner end faces. This reduces glare on the opening portion 13 when viewed obliquely from the front face compared to a case where there are no inclined faces 4c and 4d. This is preferable because the inclined faces 4c and 4d make the player suffer less from eye irritation and thus decreases the discomfort associated therewith.

As shown in FIGS. 2 and 4, the frame body 8 has the side faces 12a to 12d, and the side faces 12a to 12d are engaged with the side faces 11a to 11d, respectively, of the fixing plate 7. Specifically, the side faces 11a and 11b in the longer sides of the fixing plate 7 fit into the side faces 12a and 12b in the longer sides of the frame body 8. The side faces 11c and 11d in the shorter sides of the fixing plate 7 are engaged with protuberances 8f of grooves 8e formed along upper edges of the sides face 12c and 12d in the shorter sides of the frame body 8. This makes it easy to fix the fixing plate 7 to the frame body 8 (see FIG. 9).

As shown in FIG. 2 and FIG. 10, which is a sectional side view taken on the line D1-D2, the outer frame 9 has the opening portion 16. Protuberances 8g are formed in the frame body 8 so as to be located outside the back portions 17a and 17b surrounding the opening portion 16. Holes formed in predetermined regions of the outer frame 9, corresponding holes formed in bent portions 11e of the fixing plate 7, and holes formed in the protuberances 8g of the frame body 8 are securely fastened with fastening members 19, whereby the outer frame 9 is fixed to the frame body 8. In this way, it is possible to assemble the liquid crystal display member Y with ease.

The circuit boards 20 and 21, each including a driver IC, are attached to the liquid crystal panel 2 using a TCP method, and are accommodated in the front face frame 1 and the outer frame 9. The circuit board 20 is placed between the larger-width back portion 17a of the outer frame 9 and the exterior portion 18a, and the circuit board 21 is placed between the smaller-width back portion 17c of the outer frame 9 and the exterior portion 18c. A back face of the opening portion 16 of the outer frame 9 is covered with the transparent panel 25 such as a clear acrylic plate, thereby preventing dust or the like from entering the liquid crystal display device X (see FIG. 4).

FIG. 11 is a perspective view of the circuit board supporting member Z of the present embodiment, in its state with a cover thereof is detached therefrom, as seen from the back of the liquid crystal display member Y. The outer frame 9 is provided with the exterior portions 18 extending from the back portions 17 as a vertical wall thereof. There is formed an opening 9a by partially cutting away a corner where the larger-width back portion 17a and the exterior portion 18a extending therefrom meets.

The circuit board supporting member Z is formed as follows. A box-shaped circuit board supporting plate 26 is vertically placed in the back portion 17a of the outer frame 9 along the opening 9a so as to cover the opening 9a, and is fixed thereto with a screw 27. The box-shaped circuit board supporting plate 26 is positioned by laterally inserting fitting members 26a provided in a lower portion thereof into slits 9b formed in the back portion 17a, and is fixed thereto with the screw 27.

Inside the outer frame 9, the circuit boards 20 and 21, each being connected to the liquid crystal panel 2, are placed between the back portion 17a and the exterior portion 18a and between the back portion 17c and the exterior portion 18c, respectively. The flexible printed circuit boards 28 and 29 leading from the circuit boards 20 and 21 to the circuit board 22 are laid through the opening 9a.

The circuit board 22 that controls the circuit boards 20 and 21 is attached to the circuit board supporting plate 26 that is vertically placed on the back face of the outer frame 9, and is then fixed thereto. The flexible printed circuit boards 28 and 29 leading from the circuit boards 20 and 21 are connected to the circuit board 22 thus supported. Note that reference numerals 30 and 31 denote connectors mounted on the circuit board 22, and reference numeral 32 denotes a connector for external connection. Other members or the like are not shown in the drawing.

As described above, the circuit board supporting plate 26 is vertically placed on the back face of the outer frame 9, and the circuit board 22 is attached to the circuit board supporting plate 26. As a result, the circuit board 22 does not project to behind the opening portion 16 of the outer frame 9. This makes it possible for the player to view, from the front face of the liquid crystal panel 2, the entire part of the object (for example, a pattern or symbol) displayed by the rotary display body, for example, placed behind the opening portion 16 without being obstructed by the circuit board 22.

The liquid crystal display device X structured as described above operates as follows. An entertainment machine having such a liquid crystal display device X is provided with an opening portion formed on the rear surface of the liquid crystal panel 2 so that a translucent portion remains in the same position as the opening portions 13, 14, and 16 of the light guide plate 4, the fixing plate 7, and the outer frame 9. When the player inserts a coin and starts a game, the entertainment machine displays various ornamental patterns or game contents, for example, on the plane other than the opening portion of the liquid crystal panel 2.

At the same time, the entertainment machine rotates the rotary display body behind the outer frame 9, and makes the object (for example, a pattern or symbol) displayed thereby visible through the opening portion 1a of the liquid crystal panel 2. The player can enjoy a predetermined game by observing the object (for example, a pattern or symbol) moving at high speed in the opening portion 1a while rotating the rotary display body at high speed and trying to stop the object at a desired spot.

Figure 12:
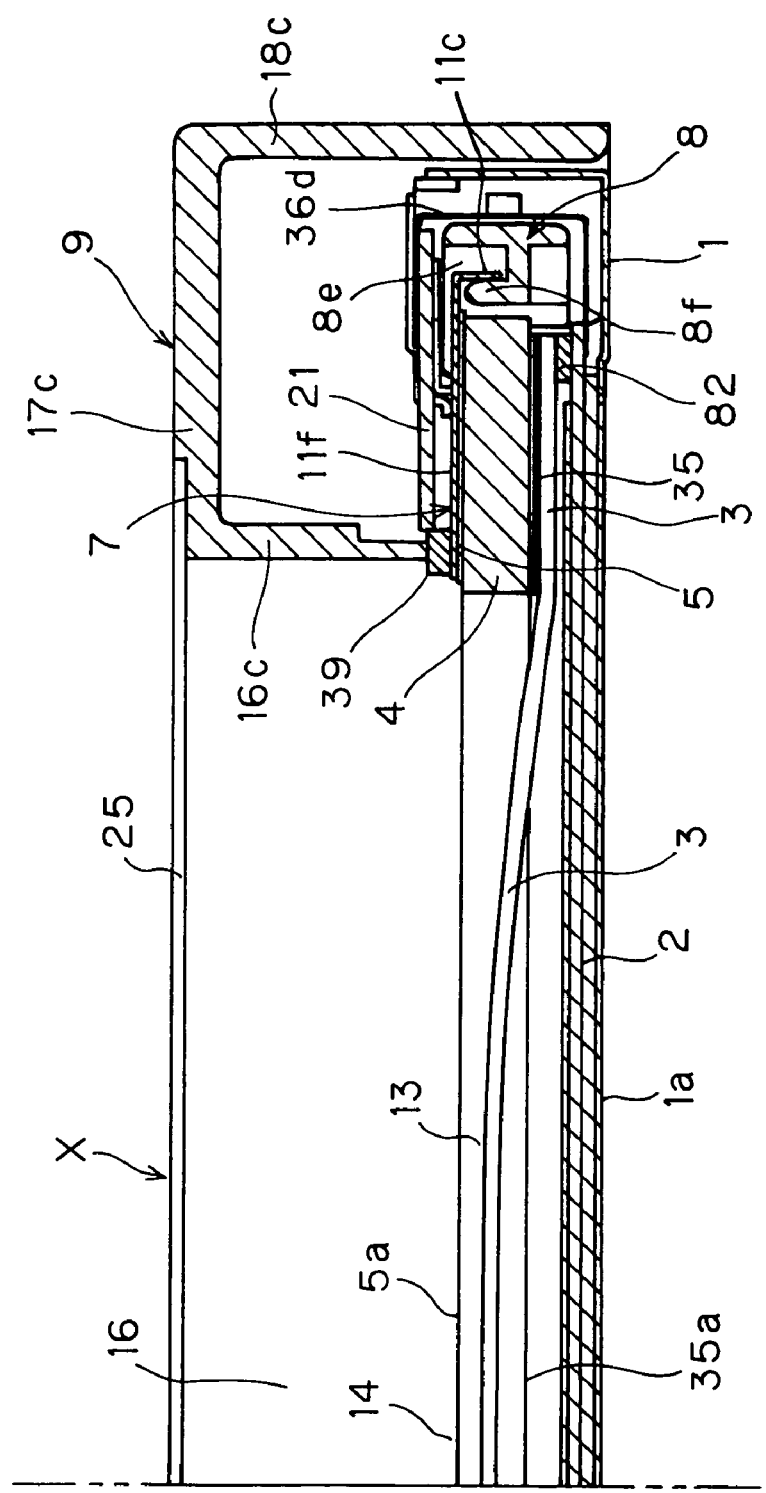
FIG. 12 is a sectional view taken on the line C1-C2 of FIG. 1 of the second embodiment of the present invention.
Figure 13:
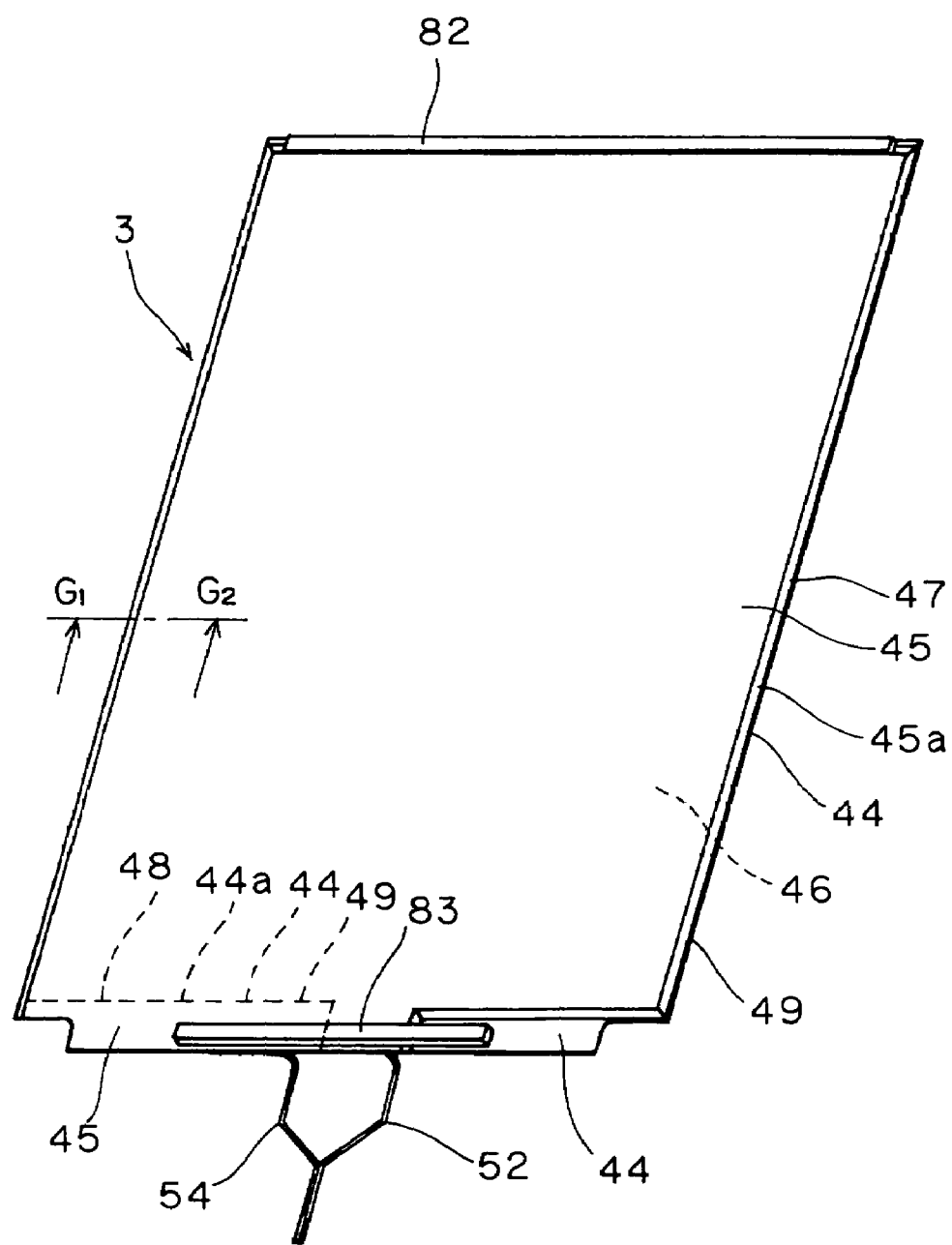
FIG. 13 is a perspective view of the liquid crystal shutter 3, as seen from the front, used in the liquid crystal display device X of the second embodiment of the present invention.
Figure 14:
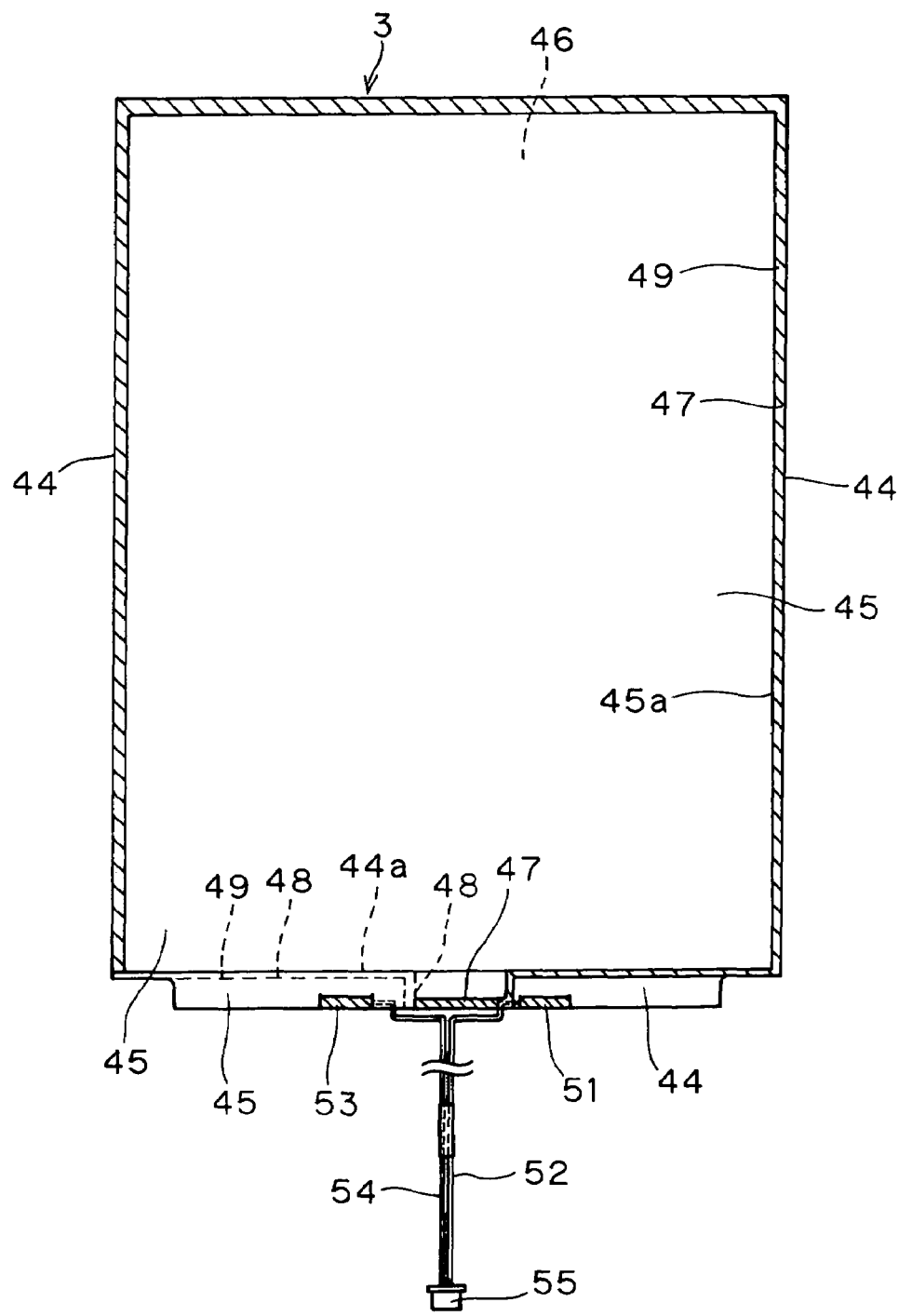
FIG. 14 is a schematic view of the liquid crystal shutter 3 of the second embodiment of the present invention.
Figure 15:
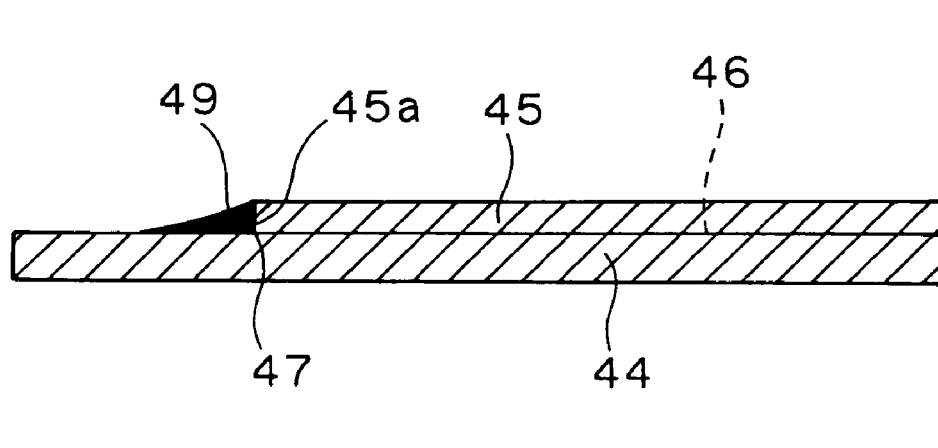
FIG. 15 is a sectional side view taken on the line G1-G2 of FIG. 13 of the second embodiment of the present invention.
Figure 16:
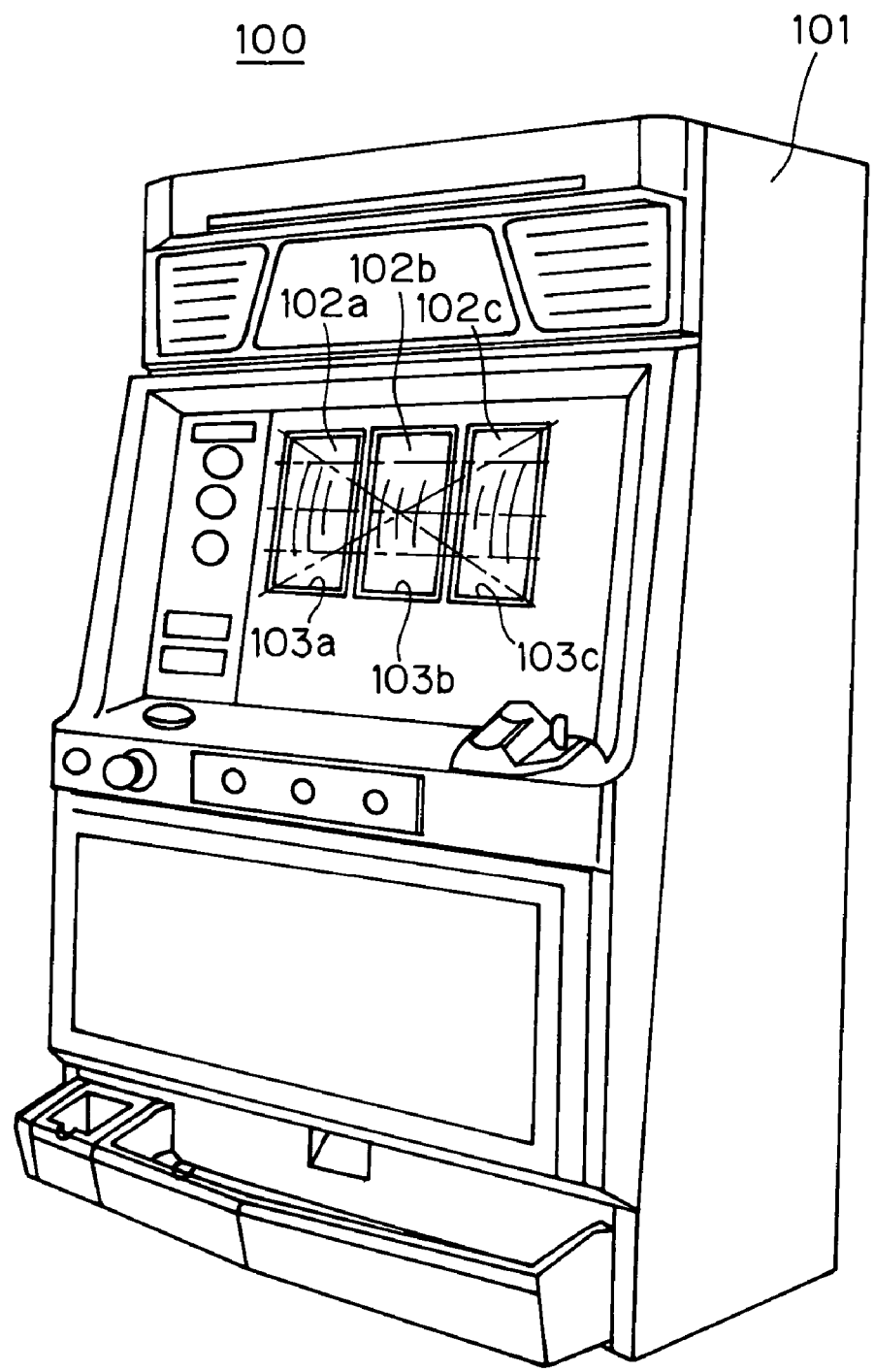
FIG. 16 is a perspective view showing the exterior appearance of an example of a conventional rotary entertainment machine.
Figure 17:
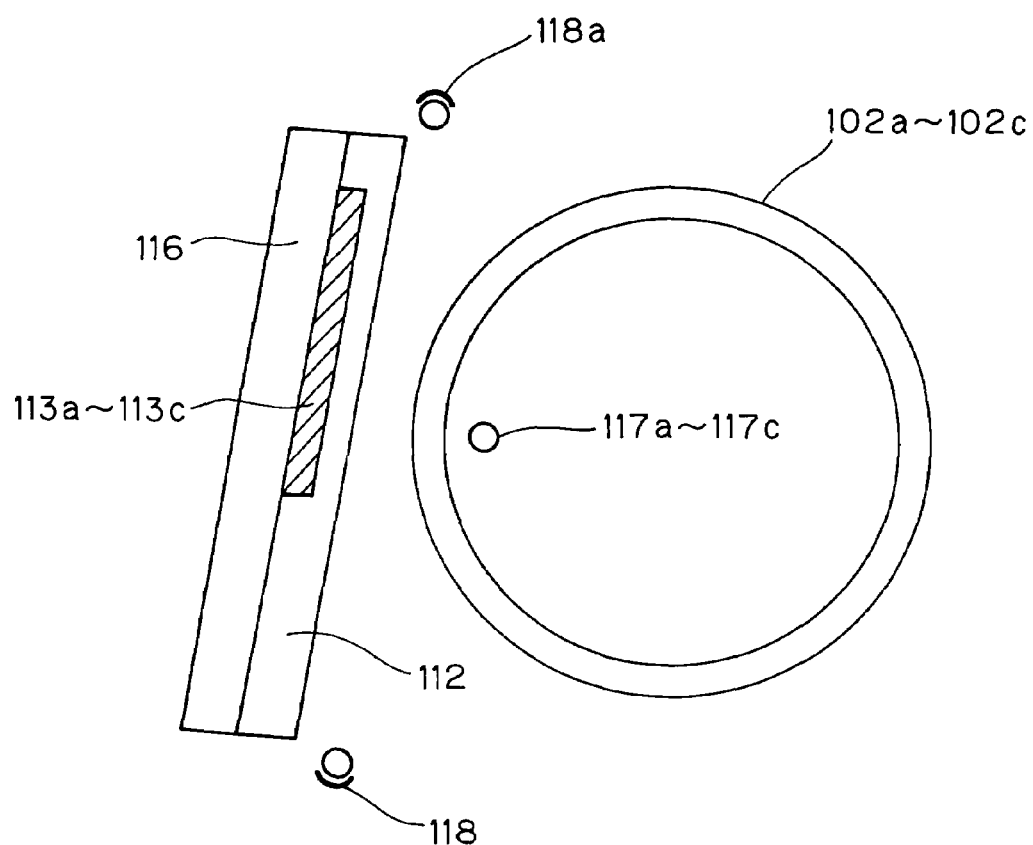
FIG. 17 is a schematic illustration showing a relationship of the rotary display body, the liquid crystal panel, and the liquid crystal shutter of the conventional rotary entertainment machine.

Next, the liquid crystal display device X of a second embodiment of the present invention is shown in FIGS. 1 to 4 and FIGS. 10 to 15. FIG. 1 is a perspective view showing the structure of the liquid crystal display member Y and the circuit board supporting member Z, as seen from the back, of the embodiments of the present invention. FIG. 2 is an exploded perspective view showing the principal components of the liquid crystal display member Y of FIG. 1. FIG. 3 is a sectional view taken on the line A1-A2 of FIG. 1. FIG. 4 is a sectional view taken on the line B1-B2 of FIG. 1. FIG. 12 is a sectional view taken on the line C1-C2 of FIG. 1. FIG. 13 is a perspective view of the liquid crystal shutter 3, as seen from the front, used in the liquid crystal display device X. FIG. 14 is a schematic view of the liquid crystal shutter 3. FIG. 15 is a sectional view taken on the line G1-G2 of FIG. 13. FIG. 10 is a sectional view taken on the line D1-D2 of FIG. 1. FIG. 11 is a perspective view of the circuit board supporting member Z of FIG. 1, in its state with a cover thereof detached therefrom.

As shown in the back perspective view of FIG. 1, the liquid crystal display device X of the present embodiment is composed of the liquid crystal display member Y and the circuit board supporting member Z. Inside a back portion 17 and an exterior portion 18 of an outer frame 9 of the liquid crystal display member Y, there are provided circuit boards 20 and 21, each being connected to a liquid crystal panel 2. The liquid crystal display member Y is fitted with the circuit board supporting member Z vertically placed in a back portion 17a of the outer frame 9. Inside the circuit board supporting member Z, there is provided a circuit board 22 electrically connected to the circuit boards 20 and 21.

First, the principal components of the liquid crystal display member Y will be described by referring to FIG. 2, which is an exploded perspective view of the liquid crystal display member Y of FIG. 1. The liquid crystal display member Y is fitted with the liquid crystal panel 2 behind a front face frame 1 having an opening portion 1a, and is provided with a liquid crystal shutter 3, a diffusing sheet 35 (not shown in FIG. 2), a light guide plate 4, and a reflecting sheet 5 behind the liquid crystal panel 2 in the order named. A lamp set 6a used as a light source is so arranged as to face an end face 4a of the light guide plate 4, and a lamp set 6b used as a light source is so arranged as to face an end face 4b of the light guide plate 4.

The light guide plate 4 and the reflecting sheet 5 have, at substantially the center thereof, opening portions 13 and 5a, respectively, so as to make an object (for example, a pattern or symbol, which is not shown in the drawing) displayed by a rotary display body, for example, placed above (behind) the reflecting sheet 5 visible from the front face of the liquid crystal panel 2.

The light guide plate 4 is placed inside a picture frame-shaped frame body 8 with the lamp set 6a and the lamp set 6b closely facing the end faces 4a and 4b, respectively, of the light guide plate 4. The frame body 8 supports edge portions of the liquid crystal panel 2, the liquid crystal shutter 3, the light guide plate 4, and the reflecting sheet 5 (see FIG. 4).

The fixing plate 7 has, at the center thereof, an opening portion 14 like those of the light guide plate 4 and the reflecting sheet 5. A flat portion 11f of the fixing plate 7 is placed behind the light guide plate 4 (more specifically, behind the reflecting sheet 5), and side faces 11a and 11b thereof support the lamp sets 6a and 6b, respectively.

There is provided a flexible circuit board 36 having one end connected to the edge portion of the liquid crystal panel 2 and the other end connected to the circuit board 20. This flexible circuit board 36 is built with a tape carrier package (TCP), for example. Incidentally, the tape carrier package (TCP) is manufactured by TAB (tape automated bonding), for example.

As in the case of the flexible circuit board 36, there is provided a flexible circuit board 36d (see FIG. 12) having one end connected to the edge portion of the liquid crystal panel 2 and the other end connected to the circuit board 21.

The front face frame 1 opens at a front face thereof, has the opening portion 1a at substantially the center thereof, and is formed in the shape of a box. The edge portions of the liquid crystal panel 2 and the bottom face of the frame body 8 are placed on the bottom of the front face frame 1 (see FIGS. 4 and 5). As shown in FIG. 10, the frame body 8 has, in a side face 12a thereof, a projecting portion 37 projecting outward.

The front face frame 1 has a hole 38 in the side face thereof. The front face frame 1 is fixed to the frame body 8 by fitting the projecting portion 37 in this hole 38 (see FIGS. 2, 4, and 10).

As shown in FIG. 4, the outer frame 9 covers the above-described components 2, 3, 35, 4, 5, 6a, 6b, and 7, is arranged behind the fixing plate 7, and is formed as a picture frame-shaped member. How the outer frame 9 is actually fixed will be described in detail later.

The outer frame 9 has an opening portion 16 at the center thereof, and is provided with the exterior portions 18a to 18d extending from the back portions 17a to 17d, respectively, as vertical walls thereof. The circuit board supporting member Z is provided on the back portion 17a in such a way that it is fixed vertically to the back face of the outer frame 9.

The front face frame 1, the diffusing sheet 35, the light guide plate 4, the reflecting sheet 5, the fixing plate 7, and the outer frame 9 have the opening portions 1a, 35a, 13, 5a, 14, and 16, respectively, at substantially the center thereof.

On the periphery of the opening portion 16 of the outer frame 9, there is formed an interior portion 16b extending to the back face side. Specifically, the interior portion 16b of the outer frame 9 is so formed as to be connected to the back portion 17a (see FIG. 4).

As in the case of the interior portion 16b, an interior portion 16c of the outer frame 9 is so formed as to be connected to the back portion 17c (see FIG. 12), an interior portion 16d of the outer frame 9 is so formed as to be connected to the back portion 17b (see FIG. 2), and an interior portion 16e of the outer frame 9 is so formed as to be connected to the back portion 17d (see FIG. 2).

The fixing plate 7 is provided with a gasket 39 around the periphery of the opening portion 14. The bottom faces of the interior portions 16b to 16e come into contact with the back face of the gasket 39. The gasket 39 is formed of, for example, urethane foam, natural rubber, or silicone rubber, and has elasticity.

As shown in FIGS. 4 and 12, a transparent panel 25 is bonded to the back portions 17a to 17d abutting on the opening portion 16 formed in the outer frame 9 with a sealing member (not shown) laid in between.

Next, referring to FIGS. 4 and 12, a first feature of the liquid crystal display device X of the present embodiment is summed up as follows. There are provided the liquid crystal panel 2, and, behind the liquid crystal panel 2 in the order named, the liquid crystal shutter 3 and the light guide plate 4, and the lamp set 6a facing the end face of the light guide plate 4.

There are provided the frame body 8 that supports the edge portions of the liquid crystal panel 2, the liquid crystal shutter 3, and the light guide plate 4, and the outer frame 9 that covers the above-described components and is formed as a picture frame-shaped member. The light guide plate 4 and the outer frame 9 have the opening portions 13 and 16, respectively, at substantially the center thereof.

The liquid crystal shutter 3 is placed in the opening portion 13 of the light guide plate 4 in such a way as to be bent toward the back face side. That is, as is the case with the conventional liquid crystal shutters, the liquid crystal shutter 3 is built with thin first and second circuit boards, which will be described later. The liquid crystal shutter 3 itself has the property of warping (bending) to one side. In this liquid crystal display device X, the bent side of the liquid crystal shutter 3 is located in the back face side.

Next, referring to FIGS. 12 to 15, a second feature of the liquid crystal display device X of the present embodiment is summed up as follows. The liquid crystal shutter 3 has a substantially rectangular shape as seen from the front, and a pair of spacers 82 and 83 are located between the vicinities of a pair of shorter sides of the rectangular shape and the edge portions of the liquid crystal panel 2 (see FIGS. 12 and 13).

The spacers 82 and 83 are formed of, for example, urethane foam, natural rubber, or silicone rubber, and are each formed in the shape of a rectangular parallelepiped. The spacers 82 and 83 each have one side to which an adhesive is applied, and are bonded to the front face of the liquid crystal shutter 3 in advance (see FIG. 13).

Next, referring to FIGS. 12 to 15, a third feature of the liquid crystal display device X of the present embodiment is summed up as follows. The diffusing sheet 35 having the opening portion 35a at substantially the center thereof is placed between the back face of the liquid crystal shutter 3 and the front face of the light guide plate 4 (see FIG. 12).

Next, referring to FIGS. 4 to 15, a fourth feature of the liquid crystal display device X of the present embodiment is summed up as follows. The liquid crystal shutter 3 has a substantially rectangular shape as seen from the front. The vicinities of a pair of longer sides of the rectangular shape are located between a pair of long shoulders 10 formed in the frame body 8 and the front face of the light guide plate 4 (see FIG. 4).

Next, referring to FIGS. 13 to 15, a fifth feature of the liquid crystal display device X of the present embodiment is summed up as follows. The liquid crystal shutter 3 has at least a first circuit board 44, a second circuit board 45 placed at a predetermined distance away from the first circuit board 44, and a liquid crystal 46 laid in between the first circuit board 44 and the second circuit board 45.

The liquid crystal shutter 3 has a sealing member 49 that fills a first gap 47 between an end face 45a of the second circuit board 45 and the first circuit board 44 and a second gap 48 between an end face 44a of the first circuit board 44 and the second circuit board 45.

On the surface of the first circuit board 44, there is formed a first electrode (not shown) having a predetermined shape, one end of which is connected to a first lead wire 52 via a first terminal 51. Similarly, on the rear surface of the second circuit board 45, there is formed a second electrode (not shown) having a predetermined shape, one end of which is connected to a second lead wire 54 via a second terminal 53. The tips of the first lead wire 52 and the second lead wire 54 are connected to a connector 55.

Next, referring to FIGS. 13 to 15, a sixth feature of the liquid crystal display device X of the present embodiment is summed up as follows. The sealing member 49 is formed of a thermosetting adhesive or a photo-setting adhesive. This is the end of the description of the features of the liquid crystal display device X.

Furthermore, referring to FIG. 4, a first additional feature of the liquid crystal display device X is summed up as follows. A first part 36a of the TCP 36 is a part extending from one end thereof connected to the edge portion of the liquid crystal panel 2 to a boundary 36b through the vicinity of the bottom of the frame body 8 and the vicinity of the side of the frame body 8.

A second part 36c is a part extending from the boundary 36b to the vicinity of the end face of the circuit board 20, and is inclined relative to the circuit board 20.

Next, referring to FIG. 4, a second additional feature of the liquid crystal display device X of the present embodiment is summed as follows. The supporting plate 40 has a flat portion 40a placed horizontally with respect to the fixing plate 7. There are formed a pair of first fixing members 40b and 40c (see FIG. 8), each being connected to the edge of the flat portion 40a and extending to the front face of the liquid crystal panel 2 and then bending perpendicularly. By fixing the first fixing members 40b and 40c to the fixing plate 7, the first distance is maintained.

Furthermore, referring to FIG. 4, a third additional feature of the liquid crystal display device X of the present embodiment is summed up as follows. The supporting plate 40 has a pair of second fixing members 40d and 40e (see FIG. 8), each being connected to the edge of the flat portion 40a and extending toward the circuit board 20 and then bending perpendicularly. By fixing the circuit board 20 on the second fixing members 40d and 40e, a second distance is maintained between the flat portion 40a and the circuit board 20.

Next, referring to FIG. 4, a fourth additional feature of the liquid crystal display device X of the present embodiment is summed up as follows. The supporting plate 40 has an opening 40f (see FIG. 8) in the flat portion 40a. In the vicinity of the opening 40f, there is formed a third fixing member 40g extending to the front face of the liquid crystal panel 2 and then bending perpendicularly. The fixing plate 7 has a protrusion 7a protruding toward the back face thereof. The third fixing member 40g is fixed to the protrusion 7a.

Furthermore, referring to FIGS. 4 and 8, a fifth additional feature of the liquid crystal display device X of the present embodiment is summed up as follows. The first fixing members 40b and 40c and the second fixing members 40d and 40e are arranged in such a way that a first virtual line F1 connecting the first fixing member 40b formed at one edge of the flat portion 40a and the first fixing member 40c formed at the other edge of the flat portion 40a and a second virtual line F2 connecting the second fixing member 40d formed at one edge of the flat portion 40a and the second fixing member 40e formed at the other edge of the flat portion 40a intersect.

Incidentally, in one of the longer sides of the flat portion 40a of the supporting plate 40 shown in FIG. 4, a bent portion 40h is formed so as to be bent toward the front face of the liquid crystal panel 2. The bent portion 40h has two projecting portions 40i, each being bent perpendicularly with respect to the bent portion 40h. The projecting portions 40i are each formed so as to make contact with a jutting portion 11g formed in the fixing plate 7.

As shown in FIG. 4, in the other of the longer sides of the flat portion 40a of the supporting plate 40, a bent portion 40j is formed so as to be bent toward the front face of the liquid crystal panel 2. There is suitably formed a hook portion 40k in the flat portion 40a of the supporting plate 40, the hook portion 40k extending toward the circuit board 20 and then extending perpendicularly inward.

The circuit board 20 is placed on the second fixing members 40e and 40d formed in the supporting plate 40, and is then fixed thereto with a screw. At this time, the hook portion 40k supports the back face of the circuit board 20, thereby preventing the circuit board 20 from wobbling.

The circuit board 22 shown in FIG. 11 has a connector 30 to which one end of the flexible printed circuit board 28 is connected. The other end of the flexible printed circuit board 28 is connected to a connector 91 shown in FIG. 4. This is the end of the description of the additional features of the liquid crystal display device X.

In FIG. 3, which is a sectional side view taken on the line A1-A2 of FIG. 1, the liquid crystal display member Y of the liquid crystal display device X is provided with the liquid crystal shutter 3 between the liquid crystal panel 2 and an object (for example, a pattern or symbol) displayed by the rotary display body, for example, which is not shown in the drawing, placed above the liquid crystal display member Y. This liquid crystal shutter 3 can perform high-speed switching, and becomes transparent when it is opened (when a voltage is applied thereto).

When the liquid crystal shutter 3 becomes transparent, since an object projection light source 24 attached to a reflector 23 is lit behind (above) the liquid crystal display member Y, the object (for example, a pattern or symbol) displayed by the rotary display body, for example, placed behind the liquid crystal display member Y becomes visible through the opening portion 16 of the outer frame 9. At this time, what is displayed in the edge portion of the liquid crystal panel 2 other than the part corresponding to the opening portion 16 becomes visible to the player from the front face of the liquid crystal display member Y.

When the liquid crystal shutter 3 is closed (when an applied voltage is in an off state), it becomes opaque white and serves as the light guide plate 4. At this time, since the object projection light source 24 is lit, the light guide plate 4 and the liquid crystal shutter 3 are illuminated. As a result, the player can view what is supposed to be displayed at the center and in the edge portion of the liquid crystal panel 2.

As shown in FIG. 4, by placing the liquid crystal shutter 3 on the shoulders 10 formed in the frame body 8, a predetermined gap G, for example, a gap of 0.4 mm is left between the liquid crystal panel 2 and the liquid crystal shutter 3. This eliminates the possibility of interference of light between the liquid crystal panel 2 and the liquid crystal shutter 3, making it possible to prevent the generation of moire in the liquid crystal panel 2.

As shown in FIG. 2, the fixing plate 7 has the opening portion 14 at the center thereof and four side faces 11a to 11d. The lamp set 6a is fixed between one of these four side faces, namely, the side face 11a and the light guide plate 4, and the lamp set 6b is fixed between the side face 11b facing the side face 11a and the light guide plate 4.

As shown in FIG. 4, a reflecting plate 6c (not shown) of the lamp set 6a and a reflecting plate 6d (not shown) of the lamp set 6b are each stuck in between the frame body 8, the fixing plate 7, and the light guide plate 4. This brings each of the lamp sets 6a and 6b into intimate contact with the light guide plate 4, preventing light from leaking out. This makes it possible to reduce eye strain of the player.

The light guide plate 4 has inclined faces 4c and 4d that abut the opening portion 13 and are increasingly separated from each other toward the liquid crystal panel 2. As a result, the light guide plate 4 has no vertical inner end faces. This reduces glare on the opening portion 13 when viewed obliquely from the front face compared to a case where there are no inclined faces 4c and 4d. This is preferable because the inclined faces 4c and 4d make the player suffer less from eye irritation and thus decreases the discomfort associated therewith.

As shown in FIGS. 2 and 4, the frame body 8 has the side faces 12a to 12d, and the side faces 12a to 12d are engaged with the side faces 11a to 11d, respectively, of the fixing plate 7. Specifically, the side faces 11a and 11b in the longer sides of the fixing plate 7 fit into the side faces 12a and 12b in the longer sides of the frame body 8. The side faces 11c and 11d in the shorter sides of the fixing plate 7 are engaged with protuberances 8f of grooves 8e formed along upper edges of the sides face 12c and 12d in the shorter sides of the frame body 8. This makes it easy to fix the fixing plate 7 to the frame body 8 (see FIG. 12).

As shown in FIG. 2 and FIG. 10, which is a sectional side view taken on the line D1-D2, the outer frame 9 has the opening portion 16. Protuberances 8g are formed in the frame body 8 so as to be located outside the back portions 17a and 17b surrounding the opening portion 16. Holes formed in predetermined regions of the outer frame 9, corresponding holes formed in bent portions 11e of the fixing plate 7, and holes formed in the protuberances 8g of the frame body 8 are securely fastened with fastening members 19, whereby the outer frame 9 is fixed to the frame body 8. In this way, it is possible to assemble the liquid crystal display member Y with ease.

The circuit boards 20 and 21, each including a driver IC, are attached to the liquid crystal panel 2 using a TCP method, and are accommodated in the front face frame 1 and the outer frame 9. The circuit board 20 is placed between the larger-width back portion 17a of the outer frame 9 and the exterior portion 18a, and the circuit board 21 is placed between the smaller-width back portion 17c of the outer frame 9 and the exterior portion 18c. A back face of the opening portion 16 of the outer frame 9 is covered with the transparent panel 25 such as a clear acrylic plate, thereby preventing dust or the like from entering the liquid crystal display device X (see FIGS. 4 and 12).

FIG. 11 is a perspective view of the circuit board supporting member Z of the present embodiment, in its state with a cover thereof is detached therefrom, as seen from the back of the liquid crystal display member Y. The outer frame 9 is provided with the exterior portion 18a extending from the back portion 17a as a vertical wall thereof. There is formed an opening 9a by partially cutting away a corner where the larger-width back portion 17a and the exterior portion 18a extending therefrom meets.

The circuit board supporting member Z is attached as follows. A box-shaped circuit board supporting plate 26 is vertically placed in the back portion 17a of the outer frame 9 along the opening 9a so as to cover the opening 9a, and is fixed thereto with a screw 27. The box-shaped circuit board supporting plate 26 is positioned by laterally inserting fitting members 26a provided in a lower portion thereof into slits 9b formed in the back portion 17a, and is fixed thereto with the screw 27.

Inside the outer frame 9, the circuit board 20 and the circuit board 21, each being connected to the liquid crystal panel 2, are placed between the back portion 17a and the exterior portion 18a and between the back portion 17c and the exterior portion 18c, respectively. The flexible printed circuit boards 28 and 29 leading from the circuit boards 20 and 21 to the circuit board 22 are laid through the opening 9a.

The circuit board 22 that controls the circuit boards 20 and 21 is attached to the circuit board supporting plate 26 that is vertically placed on the back face of the outer frame 9, and is then fixed thereto. The flexible printed circuit boards 28 and 29 leading from the circuit boards 20 and 21 are connected to the circuit board 22 thus supported. Note that reference numerals 30 and 31 denote connectors mounted on the circuit board 22, and reference numeral 32 denotes a connector for external connection. Other members or the like are not shown in the drawing.

As described above, the circuit board supporting plate 26 is vertically placed on the back face of the outer frame 9, and the circuit board 22 is attached to the circuit board supporting plate 26. As a result, the circuit board 22 does not project to behind the opening portion 16 of the outer frame 9. This makes it possible for the player to view, from the front face of the liquid crystal panel 2, the entire part of the object (for example, a pattern or symbol) displayed by the rotary display body, for example, placed behind the opening portion 16 without being obstructed by the circuit board 22.

The liquid crystal display device X structured as described above operates as follows. An entertainment machine having such a liquid crystal display device X is provided with an opening portion formed on the rear surface of the liquid crystal panel 2 so that a translucent portion remains in the same position as the opening portions 13, 14, and 16 of the light guide plate 4, the fixing plate 7, and the outer frame 9. When the player inserts a coin and starts a game, the entertainment machine displays various ornamental patterns or game contents, for example, on the plane other than the opening portion of the liquid crystal panel 2.

At the same time, the entertainment machine rotates the rotary display body behind the outer frame 9, and makes the object (for example, a pattern or symbol) displayed thereby visible through the opening portion 1a of the liquid crystal panel 2. The player can enjoy a predetermined game by observing the object (for example, a pattern or symbol) moving at high speed in the opening portion 1a while rotating the rotary display body at high speed and trying to stop the object at a desired spot.

What is claimed is:

1. A liquid crystal display panel comprising:
    a liquid crystal panel;
    a liquid crystal shutter and a light guide plate placed behind the liquid crystal panel in an order named;
    a lamp set facing an end face of the light guide plate;
    a frame body that supports edge portions of the liquid crystal panel, the liquid crystal shutter, and the light guide plate;
    a fixing plate having a flat portion behind the light guide plate and a side face that supports the lamp set;
    a supporting plate that is located behind the fixing plate at a first distance away therefrom and that is partially supported by the fixing plate;
    a circuit board placed behind the supporting plate;
    a flexible board having one end connected to the edge portion of the liquid crystal panel and another end connected to an edge portion of the circuit board; and
    an outer frame that covers the liquid crystal panel, the liquid crystal shutter, the light guide plate, the lamp set, the frame body, the fixing plate, the supporting plate, the circuit board, and the flexible board, the outer frame being formed as a picture frame-shaped member,
    wherein the light guide plate, the fixing plate, the outer frame each have an opening portion at substantially a center thereof, and
    wherein the supporting plate, the circuit board, and the flexible board are placed inside the picture frame-shaped member adjacent to the opening portion of the outer frame.

2. The liquid crystal display device of claim 1,
    wherein the flexible board comprises a tape carrier package.

3. The liquid crystal display device of claim 2,
    wherein the tape carrier package includes
    a first part extending from the one end to a boundary through a vicinity of a bottom of the frame body and a vicinity of a side of the frame body, and a second part extending from the boundary to a vicinity of an end face of the circuit board, the second part being inclined relative to the circuit board.

4. The liquid crystal display device of claim 1,
wherein the supporting plate has a flat portion and a pair of first fixing members formed therein, the flat portion being placed in parallel with the fixing plate and the pair of first fixing members each being connected to an edge of the flat portion and extending to a front face of the liquid crystal panel and then bending perpendicularly, and
wherein the first distance is maintained by fixing the first fixing member to the fixing plate.

5. The liquid crystal display device of claim 4,
wherein the supporting plate has a pair of second fixing members formed therein, the pair of second fixing members each being connected to an edge of the flat portion and extending toward the circuit board and then bending perpendicularly, and
wherein a second distance is maintained between the flat portion and the circuit board by fixing the circuit board on the second fixing members.

6. The liquid crystal display device of claim 4,
wherein the supporting plate has
an opening in the flat portion, and
a third fixing member formed in a vicinity of the opening, the third fixing member extending to the front face of the liquid crystal panel and then bending perpendicularly,
wherein the fixing plate has a protrusion protruding toward a back face thereof, and
wherein the third fixing member is fixed to the protrusion.

7. The liquid crystal display device of claim 4,
wherein the first fixing members and the second fixing members are arranged in such a way that a first virtual line connecting the first fixing member formed at one edge of the flat portion and the first fixing member formed at another edge of the flat portion and a second virtual line connecting the second fixing member formed at one edge of the flat portion and the second fixing member formed at another edge of the flat portion intersect.

8. A liquid crystal display device comprising:
a liquid crystal panel;
a liquid crystal shutter and a light guide plate placed behind the liquid crystal panel in an order named;
a lamp set placed so as to face an end face of the light guide plate;
a frame body that supports edge portions of the liquid crystal panel, the liquid crystal shutter, and the light guide plate; and
an outer frame that covers the liquid crystal panel, the liquid crystal shutter, the light guide plate, the lamp set, and the frame body, the outer frame being formed as a picture frame-shaped member,
wherein the light guide plate and the outer frame each have an opening portion at substantially a center thereof, and
wherein the liquid crystal shutter is placed in the opening portion of the light guide plate in such a way as to be bent toward a back face side.

9. The liquid crystal display device of claim 8,
wherein the liquid crystal shutter has a substantially rectangular shape as seen from a front, and
wherein a pair of spacers are located between vicinities of a pair of shorter sides of the rectangular shape and the edge portions of the liquid crystal panel.

10. The liquid crystal display device of claim 9, further comprising:
a diffusing sheet having an opening portion at substantially a center thereof,
wherein the diffusing sheet is placed between a back face of the liquid crystal shutter and a front face of the light guide plate.

11. The liquid crystal display device of claim 8,
wherein the liquid crystal shutter has a substantially rectangular shape as seen from a front, and
wherein vicinities of a pair of longer sides of the rectangular shape are located between a pair of long shoulders formed in the frame body and a front face of the light guide plate.

12. The liquid crystal display device of claim 8,
wherein the liquid crystal shutter includes at least
a first circuit board,
a second circuit board placed at a predetermined distance away from the first circuit board,
a liquid crystal laid in between the first circuit board and the second circuit board, and
a sealing member that fills a first gap between an end face of the second circuit board and the first circuit board and a second gap between an end face of the first circuit board and the second circuit board.

13. The liquid crystal display device of claim 12,
wherein the sealing member comprises a thermosetting adhesive or a photo-setting adhesive.

* * * * *